United States Patent
Benedikt et al.

(10) Patent No.: US 12,433,673 B2
(45) Date of Patent: Oct. 7, 2025

(54) DEVICE FOR INDUCING CELL DEATH

(71) Applicant: University College Cardiff Consultants Limited, Cardiff (GB)

(72) Inventors: Johannes Benedikt, Cardiff (GB); Robert Edward Mansel, Cardiff (GB); Wen Guo Jiang, Cardiff (GB); Tracey Amanda Martin, Cardiff (GB); Philippa Young, Cardiff (GB)

(73) Assignee: University College Cardiff Consultants Limited, Cardiff (GB)

( * ) Notice: Subject to any disclaimer, the term of this patent is extended or adjusted under 35 U.S.C. 154(b) by 799 days.

(21) Appl. No.: 17/608,304

(22) PCT Filed: May 1, 2020

(86) PCT No.: PCT/GB2020/051086
§ 371 (c)(1),
(2) Date: Nov. 2, 2021

(87) PCT Pub. No.: WO2020/222020
PCT Pub. Date: Nov. 5, 2020

(65) Prior Publication Data
US 2022/0249162 A1    Aug. 11, 2022

(30) Foreign Application Priority Data

May 2, 2019 (GB) .................................. 1906172

(51) Int. Cl.
*A61B 18/18* (2006.01)
*A61N 1/36* (2006.01)
(Continued)

(52) U.S. Cl.
CPC ...... *A61B 18/1815* (2013.01); *A61N 1/36002* (2017.08); *A61N 1/40* (2013.01);
(Continued)

(58) Field of Classification Search
CPC ...... A61B 18/1815; A61B 2018/00333; A61B 2018/00571; A61B 2018/00642;
(Continued)

(56) References Cited

U.S. PATENT DOCUMENTS 8,684,901 B1   4/2014  Zabara
2005/0245920 A1  11/2005  Vitullo et al.
(Continued)

FOREIGN PATENT DOCUMENTS

WO   2018224404 A1   12/2018

OTHER PUBLICATIONS

Bagdad, et al., "Near-Field Scanning Microwave Microscope Platform Based on a Coaxial Cavity Resonator for the CHaracterization of Semiconductor Structures", Solid State Electronics 159 (2019) 150-156.
(Continued)

*Primary Examiner* — Tigist S Demie
(74) *Attorney, Agent, or Firm* — LeonardPatel PC; Sheetal S. Patel; Michael A. Leonard, II

(57) ABSTRACT

The present disclosure provides a medical device (100) for inducing cell death in cancer cells. The device comprises a signal generator (102) arranged to generate a pulsed electrical signal, and a transmitter (116) arranged to receive the pulsed electrical signal and generate, in response to the electrical signal, an electric field in a treatment volume. The device (100) is arranged such that the pulsed electrical signal received by the transmitter (116) has a pulse width of 0.1 microsecond to 1 millisecond, and a signal frequency of 10 Megahertz to 20 Gigahertz. The present disclosure also provides a method of inducing cell death. The method comprising a step of generating, using a transmitter (116), a pulsed time varying electric field in a treatment volume comprising a volume of cells to be treated. The electric field (Continued)

has a pulse width of 0.1 microsecond to 1 millisecond, and a signal frequency of 10 Megahertz to 20 Gigahertz.

22 Claims, 12 Drawing Sheets

(51) Int. Cl.
    *A61N 1/40*     (2006.01)
    *A61B 18/00*     (2006.01)

(52) U.S. Cl.
    CPC ............... *A61B 2018/00333* (2013.01); *A61B 2018/00642* (2013.01); *A61B 2018/00678* (2013.01); *A61B 2018/00708* (2013.01); *A61B 2018/00714* (2013.01); *A61B 2018/00785* (2013.01); *A61B 2018/00815* (2013.01)

(58) Field of Classification Search
    CPC   A61B 2018/00678; A61B 2018/00708; A61B 2018/00714; A61B 2018/00785; A61B 2018/00815; A61B 2018/00875; A61B 2018/00982; A61B 2018/1861; A61N 1/36002; A61N 1/40
See application file for complete search history.

(56) References Cited

U.S. PATENT DOCUMENTS

| | | |
|---|---|---|
| 2007/0250139 A1 | 10/2007 | Kanzius |
| 2008/0076958 A1 | 3/2008 | Britva et al. |
| 2010/0016651 A1 | 1/2010 | Sivo |
| 2011/0112520 A1 | 5/2011 | Michael |
| 2012/0089209 A1 | 4/2012 | Schoenbach et al. |
| 2013/0261711 A1 | 10/2013 | Sivo |
| 2013/0345697 A1 | 12/2013 | Garcia et al. |
| 2015/0289923 A1 | 10/2015 | Davalos et al. |
| 2017/0266438 A1* | 9/2017 | Sano ..................... A61N 1/327 |
| 2019/0038337 A1* | 2/2019 | Schoenbach ........... A61N 5/025 |

OTHER PUBLICATIONS

International Search Report & Written Opinion, issued Jul. 14, 2020, PCT/GB2020/051086.

UK Search Report, issued Oct. 31, 2019, GB Application No. 19061720.

Wood, et al., "A Review of Low-Intensity Ultrasound for Cancer Therapy", Ultrasound in Med. & Biol., vol. 41, No. 4, pp. 905-928, 2015.

* cited by examiner

DEVICE FOR INDUCING CELL DEATH

FIELD OF THE INVENTION

The present invention concerns a medical device for inducing cell death, for example in cancer cells. More particularly, this invention concerns a medical device for inducing cell death by subjecting a volume of cells to a time varying electric field. The invention also concerns a method of inducing cell death.

BACKGROUND OF THE INVENTION

Methods of treating cancer cells using electromagnetic radiation are well known. Typical methods involve the use of high energy radiation. For example X-rays may be used to cause cell death by damaging the DNA of the cancer cells. Other methods rely on the incident electromagnetic radiation producing a temperature rise within the irradiated volume which causes cell death. The average power levels of such techniques are relatively high. The choice of frequency for the electromagnetic signal is often determined by the capability of the tissue to absorb radiation at a given frequency. The absorption typically increases with rising frequencies, therefore many of the existing methods utilise higher frequencies of radiation.

Treatment of cancer using high frequency electromagnetic radiation can cause several side effects, in part due to the destruction of healthy cells as well as the cancerous cells during treatment.

The present invention seeks to mitigate the above-mentioned problems. Alternatively or additionally, the present invention seeks to provide an improved device and method for inducing cell death, particularly in cancer cells.

SUMMARY OF THE INVENTION

The present invention provides, according to a first aspect, a medical device for inducing cell death in cancer cells. The device comprises a signal generator arranged to generate a pulsed electrical signal, and a transmitter arranged to receive the electrical signal and generate an electric field in response to the electrical signal. In use, the electric field is generated in a treatment volume, preferably containing a volume of cells to be treated (i.e. killed). The device is arranged such that the pulsed electric signal received by the transmitter has a pulse width of 0.1 microseconds (μs) to 1 millisecond (ms), and a signal frequency of 10 Megahertz (MHz) to 20 Gigahertz (GHz).

It may be possible to induce cell death in a volume of cells, in particular cancer cells, by exposing the cells to a time-varying electric field that oscillates (i.e. changes direction) at a signal frequency in the range 10 MHz to 20 GHz. The optimum signal frequency may depend on the properties and characteristics of the cells being treated. It has been found, in the experiments conducted, that cell death begins to occur a number of hours after exposure to the electric field. In some cases cell death can be observed after 2 to 3 hours, and in other cases after 24 hours. Cell death typically continues for at least 48 hours after exposure. It will be appreciated that such timescales may not be seen in all cases and should not limit the scope of protection. By generating the electric field in pulses, e.g. by turning the electric field successively on and off, it is possible to significantly reduce or eliminate a temperature rise in the volume of cells as a result of exposure to the electric field. Reducing or eliminating a temperature rise may help avoid the destruction of cells surrounding the treatment volume during exposure to the electric field.

Without wishing to be bound by theory, the inventors postulate that a time varying electric field at the frequencies mentioned herein can deliver energy into certain types of cell. The energy is not delivered continuously but is rather packaged up into pulses due to the pulsed nature of the electric field. It is thought that the energy transients trigger a programmed cell death mechanism. In particular, the energy transients may cause microscopic temperature variations or other changes that cause cell movement and interaction. The resulting cell stress may trigger a cell death event. Cancer cells and tumours exhibit different mechanical properties such as an increase in fibrillar collagen density, increase in stromal collagen, and stiffening of the extracellular matrix. It is possible that the energy transients facilitate cell interaction and therefore stress at the cellular level due to the particular mechanical properties of cancer cells. It may be that an electric field at a certain signal frequency and pulse width causes a certain resonance in the cells or a part thereof.

The inventors also postulate that non-radiative evanescent fields that form at the interface between the transmitter and the cells, i.e. near-field, might play a role in causing the cell death. An evanescent field is an oscillating electric and/or magnetic field that does not propagate as an electromagnetic wave through a medium. Instead its energy is spatially concentrated in close proximity to the transmitter, the penetration depth of the evanescent field may only be a few tens of micrometres or less. In so far as the transmitter acts as an antenna, the evanescent field is within the near field region.

By way of some background. With an increasing distance from the transmitter, the near-field contributions form the radiative far-field. The near-fields comprise electric and magnetic fields that can exist independently of each other, where also one type of field can dominate the other. The far-field consists of both the electric and magnetic fields, i.e. electromagnetic field, that are related to each other. So a change in the electric field will produce a change in the magnetic field. The ratio of electric and magnetic field intensities is the wave impedance. The fields' interaction with the treated volume can cause energy to deflect back to the source. This region is therefore called the reactive near field or the evanescent field. Its penetration depth is approximately $\lambda/2\pi$, which is about 0.159 of a wavelength. Following the reactive near-fields, a zone is formed where the interaction with the medium can fail to return energy back to the source with the relationship between the electric and magnetic fields still not fully established. This zone is referred as the radiative near-field region, which extends to about one wavelength from the transmitter. Any fields beyond that are typically referred the far-fields.

The formation of an evanescent field can be more pronounced at a boundary between two media where there is a relatively large impedance difference. This may be the case in the present invention due to the difference between the properties of the material used for the transmitter and properties of the biological tissue.

In the present invention, the evanescent field at the transmitter may be composed of electric and magnetic fields that oscillate at the signal frequency. Within the evanescent field region, energy is carried back and forth between the transmitter and the field. For example, current oscillating in the transmitter may create a purely magnetic component, which decreases as the transmitter current begins to reverse, producing a transfer of the magnetic energy of the field back to electrons in the transmitter. This returns energy to the transmitter in a regenerative way, so that it is not lost. A similar transfer of energy between the transmitter and treated volume is established due to resulting electrical fields. Due to oscillating voltages an electric charge may build up and result in a local electric field around that section of transmitter. When the voltage signal reverses the existing electric field impairs a force on the electrons within the transmitter in the opposite direction. However, in case there is a second conductor, which is not part of the transmitter, placed within the evanescent fields then its electrons can also absorb the returning energy from the magnetic and electrical fields. Therefore, if the transmitter is placed within a medium which contains charged particles (e.g. ions), energy may be transferred into the medium within the evanescent field region. It is thought that the evanescent field may cause mechanical movement of any charged particles or ionic content within a small volume surrounding the transmitter, which translates to mechanical pressure waves (e.g. sound waves) within the treatment volume. It is thought this mechanical movement might, at least in part, lead to the observed cell death. It is understood that the energy transfer between the transmitter and the medium within the evanescent field region may depend on the relationship between the frequency of the signal and the characteristics of the charged particle and/or ionic content.

A property of evanescent fields is that there is no net energy flow. Strictly speaking, this property holds only for a single direction when moving away from the transmitter. This property may help minimise energy propagation into, and any resulting temperature increase of, the treatment volume as a whole. It is possible that energy loss from the evanescent field will occur along the surface of the transmitter. Such energy loss is likely to affect a very small volume surrounding the transmitter, rather than the entire treatment volume. As the energy losses are focused into such a small volume, changes of temperature in a very thin layer along the transmitter may occur. This may result in rapid volume changes of this thin layer, which translate to the mechanical pressure waves that can affect the entire volume to be treated.

The evanescent fields may directly impart a force on any ions or any electrically charged particles within the cells proximate the transmitter. It might be the resulting movement or vibration of the ionic content or any charged particles within the sample that leads to the generation of the mechanical pressure waves within the treatment volume.

According to the present invention, the device may be configured such that the transmitter generates an evanescent field in the treatment volume. In other words, the electric field generated by the transmitter in the treatment volume may comprise an evanescent field. The device may be configured to expose a volume of cells to be treated to an evanescent field generated by the transmitter. The device may be configured to expose a volume of cells to be treated to mechanical pressure waves resultant from an evanescent field generated by the transmitter. The device may be configured to expose a volume of cells to be treated to a combination of propagating electromagnetic radiation and mechanical pressure waves resultant from an evanescent field generated by the transmitter. The volume exposed to the mechanical pressure waves may be larger than the volume affected by the evanescent field, i.e. the mechanical pressure waves may extend beyond the region in which the evanescent field is generated (e.g. beyond the penetration depth of the evanescent field).

The signal frequency may be more than or equal to 10 MHz, 100 MHz, 1 GHz or 2 GHz. The signal frequency may be less than or equal to 5 GHz, 6 GHz, 10 GHz or 20 GHz. For example, the signal frequency may be in the range 100 MHz to 10 GHz. Preferably, the signal frequency is in the range 1 GHz to 6 GHz. The signal frequency may be in the range 2 GHz to 5 GHz. For example, the signal frequency may be 3 GHz. The signal frequency may be in the range 1 GHz<f≤20 GHz.

The signal frequency may be selected in dependence on the cells being treated and/or the size of the treatment volume. Lower frequencies may penetrate deeper into the tissue and allow treatment of larger volumes. Higher frequencies may have a smaller penetration depth and allow treatment to be limited to smaller volumes. Also, the size of the volume where the evanescent fields are dominant may increase with decreasing frequency.

The pulses may have a pulse width of more than or equal to 0.1 μs, 1 μs, 10 μs or 30 μs. The pulses may have a pulse width of less than or equal to 80 μs, 100 μs, 500 μs, or 1000 μs. For example, the pulse width may be in the range 1 μs to 500 μs. Preferably, the pulse width is in the range 1 μs to 100 μs. The pulse width may be in the range 30 μs to 80 μs. For example, the pulse width may be 50 μs microseconds. The pulse widths, including the rise and fall times of the pulse, may affect the movement of ions and/or charged particles within the volume governed by the evanescent fields.

The electrical signal may have a duty cycle. The duty cycle may be the percentage of the time that the electric field is on (during a pulse) during one pulse period. The pulse period may be the time that the electric field is on (during a pulse) plus the time the electric field is off (between) pulses; i.e. the pulse period may be the total time taken for one on-and-off cycle. The duty cycle may be approximately 20% or less, 10% or less, or 5% or less. The duty cycle may be 0.1% or higher, 0.5% or higher, or 1% or higher. For example, the duty cycle may be in the range 0.5% to 10%.

The device may be arranged to emit the pulses at a pulse frequency. The pulse frequency is the inverse of pulse period. The pulse frequency may be more than or equal to 0.01 kHz, 0.02 kHz, 0.1 kHz or 1 kHz. The pulse frequency may be less than or equal to 10 kHz, 100 kHz or 1 MHz. For example, the pulse frequency may be in the range 0.01 kHz to 1 MHz. The pulse frequency may be in the range 0.01 kHz to 100 kHz. Preferably, the pulse frequency is in the range 0.1 kHz to 10 kHz. For example, the pulse frequency may be 1 kHz.

By way of example, for a pulse width of 30 μs and a duty cycle of 5%, the pulse period is 600 μs, the time between pulses is 570 μs and the pulse frequency is approximately 1.67 kHz (i.e. $1.67 \times 10^3$ pulses per second).

It will be understood that the signal frequency is the frequency at which the electric signal oscillates during the generation of a pulse of electric signal, and the pulse frequency is the frequency at which the pulses are emitted.

The length of time that the cells being treated are required to be exposed to the electric field in order to induce cell death (herein referred to as the exposure time or the treatment duration) may depend on the strength of the electric field, which may include the evanescent fields in close proximity of the transmitter. The exposure time may also depend on the rate at which energy from the electric field is absorbed by the cells and/or any temperature rise within the treatment volume, which may depend on the type of cells being treated.

The strength of the electric field may depend on the power of the electrical signal supplied to the transmitter, the physical characteristics of the transmitter (e.g. size and shape), and the impedance of the material in the treatment volume. The electric field may have a peak strength more than or equal to 500 V/cm or 1000 V/cm. The electric field may have a peak strength less than or equal to 3000 V/cm or 5000 V/cm. For example, the electric field may have a peak strength in the range 500 V/cm to 5000 V/cm. The electric field may have a peak strength in the range 1000 V/cm to 3000V/cm. In an example, the electric field has a peak strength of $0.21 \times 10^6$ V/m proximate the transmitter.

The strength of the electric field may increase as the impedance of the material in the treatment volume increases, and the strength of the electric field may fall as the impedance of the material in the treatment volume falls.

The device may be configured such that the peak power of the electrical signal supplied to the transmitter may be more than 10 milliwatts (mW), 100 mW, or 1 W. The device may be configured such that the peak power of the electrical signal supplied to the transmitter may be less than 50 W, 100 W or 300 W. For example, the peak power may be in the range 10 mW to 300 W. The peak power may be in the range 100 mW to 100 W. Preferably, the peak power is in the range 1 W to 50 W. The peak power may be in the range 1 W to 30 W. For example, the peak power may be 30 Watts.

In an example, the signal frequency is in the range 1 GHz to 6 GHz, the pulse width is in the range 1 µs to 100 µs, the pulse frequency is in the range 0.1 kHz to 10 kHz, and the peak power is in the range 1 W to 50 W.

The average power of the electrical signal supplied to the transmitter may be equal to the average power multiplied by the duty cycle. For example, the average power may be in the range 0.05 to 2.5 Watts. For example, the average power may be 1.5 Watts. It will be understood that same average power levels may be achieved through a different modulations of the electrical signal. It will be understood that pulsing (e.g. by simply turning the signal on and off periodically to create substantially square wave packets) is only one method to create a large difference between the peak and average power levels. For example, the shape of the waveform of the pulsed electrical signal could be changed to increase or reduce the average power level, whilst keeping the peak power level constant. The present invention is not limited to an electrical signal being modulated, for example, by a square waveform.

The higher the average power of the electrical signal, the shorter the exposure time that may be required to induce cell death. By way of comparison, in one example having peak power levels of approximately 1 to 2 Watts, an exposure time of 8 hours may be required to successfully induce cell death in the treatment volume. In another example having peak power levels of 50 Watts, an exposure time of approximately 3 to 15 minutes may be required to successfully induce cell death in the treatment volume.

Preferably the electric field in the treatment volume is directly generated by the transmitter, i.e. the electric filed in the treatment volume is generated at, and may radiate from, the transmitter itself. The electric field may have a penetration depth at which the strength of the electric field inside the material falls to 1/e of its peak value. The penetration depth may depend on the dielectric properties of the material in the treatment volume and/or the signal frequency of the electric field. Different dielectric properties may result in varying absorption of the electric field energy into the treatment volume. For example, for a signal frequency of 2.2 Gigahertz and a treatment volume containing material with dielectric properties similar to water, the penetration depth may be approximately 23 mm. The penetration depth, and therefore the size of the treatment volume, may be changed by varying the signal frequency of the electrical signal. In some embodiments, the electric field at and/or beyond the penetration depth may not be sufficiently strong for successful treatment, i.e. might not be sufficient to induce cell death in a sufficient number of cells to treat the disease. Preferably, the transmitter is movable such that the cells to be treated may be positioned within the penetration depth of the electric field. It will be understood that the penetration depth relating to the absorption of the net electric field is different from the penetration depth of the evanescent field which is related to the properties of the interface between the transmitter and the treated volume.

The transmitter may be a broadband transmitter, that is to say, suitable for generating/configured to generate an electric field in response to an electrical signal over a range of signal frequencies, and preferably over the range 10 MHz to 20 GHz, or at least the range 100 MHz to 10 GHz.

The device may comprise a probe that comprises the transmitter. The transmitter may be arranged at a tip of the probe. The probe may be arranged to radiate an electric field from the tip of the probe. The probe may be insertable into a human body, for example during treatment. The probe may be elongate. The probe may be holdable in a single hand, i.e. the probe may be a hand held probe. The probe may be dimensioned for use during minimally invasive treatment such as keyhole surgery or image guided minimally invasive treatment under local anaesthetic cover. For example, the diameter of the probe may be less than 2 cm, less than 1 cm, or less than 0.2 cm. The use of such a probe may help ensure that the cells to be treated are directly exposed to the electric field. The use of a probe may in particular help ensure that at least some of the cells to be treated are exposed to the evanescent field. The use of a probe may help reduce the exposure of the tissue surrounding the treatment volume to the electric field.

Embodiments of the present invention utilising a probe may have particular application to small and/or early stage breast cancer tumours. The present invention may allow the treatment of such cancers by way of a minimally invasive procedure and with minimal cosmetic defect. The impact of over-diagnosis and/or—treatment of such cancers, for example during screening programmes, may therefore be reduced. Keeping temperature rises to a minimum may help avoid damage to surrounding tissue, for example due to burning, and may also allow treatment to be conducted under local anaesthetic only. Other applications are also envisaged, for example the use of small diameter probes for the treatment of brain tumours.

The device may comprise an endoscope for guiding an insertion of the transmitter into the volume of cells to be treated. In embodiments, the probe may comprise, or be dimensioned to accommodate, a light emitting tip of the endoscope.

The probe may comprise one or more control switch arranged to control operation of the device. For example, the control switch may control operation of the signal generator. Operation of the control switch may turn the pulsed electric signal on or off.

The transmitter may be formed of a coaxial cable. Hence, the probe may comprise a coaxial cable. The coaxial cable may comprise an inner conductor, the inner conductor being surrounded by an intermediate insulating layer, and the intermediate insulating layer being surrounded by an outer conductor. The coaxial cable may be arranged such that the electric field is generated at, and may radiate from, an end (e.g. a free end, an open end and/or an unconnected end) of the coaxial cable. In response to the electrical signal, a potential difference may be generated between the inner conductor and the outer conductor. In response to the potential difference, the electric field may be established. The electric field may extend into the treatment volume. The variation of the electric field with time may cause the electric field to be radiated/transmitted out from the end of coaxial cable. In close proximity to where the electric field is generated, a near field, i.e. evanesce, may be established. The variation of the electric field may also establish a propagating far-field. The transmitter could thus be considered as an antenna from which the electric field is emitted.

The transmitter (e.g. the coaxial cable) may comprise a tapered end arranged to radiate the electric field. The end of the coaxial cable may taper to a point. The tapered end may, for example, be formed by sharpening the end of the coaxial cable. The tapered end may aid insertion into the patient. In embodiments, the probe may comprise a plurality of tapered sections at an end of the coaxial cable at which the electric field is radiated. The coaxial cable may have flexible, semi-rigid and/or rigid sections. The rigidity of the cable may be selected in dependence on the application. Example coaxial cables include RG-405 and RF-402 semi-rigid coaxial cables.

The transmitter may be arranged to be placed on external surfaces of the body, for example the skin. The transmitter may be in the form of a patch antenna. In such embodiments, the device may be used to expose cancer cells at the surface of the body, or just below it, to the electric field, which may include an evanescent field. Greater penetration depths may be achieved by using lower signal frequencies.

The device may comprise one or more further transmitters. The multiple transmitters may be used simultaneously to help expose a larger volume to the electric field. The signal frequency, pulse frequency and/or the phase of the electrical signal supplied to each transmitter may be independently selectable. The device may be arranged such that the electric field generated by each of the transmitters is synchronised. The transmitters may be synchronised such that they each generate an electric field at the same signal frequency and pulse frequency. The signal frequency, pulse frequency and/or the phase of the electrical signal supplied to each synchronised transmitter may be the same.

The device may be arrangeable in such a way that the electric fields generated by a plurality of transmitters combine in phase in a treatment volume. The use of multiple transmitters, particularly those where the electric field combines in phase, may help increase the penetration depth of the electric field. Additionally, the power of each individual transmitter may be kept relatively low, which may help mitigate temperature increases in proximity to each transmitter.

The device may further comprise a temperature sensor arranged to obtain an indication of the temperature of the treatment volume. The temperature sensor may allow the treatment (i.e. exposure of the cells to the electric field) to be regulated in dependence on the temperature of the treatment volume. The device may reduce the intensity of the treatment if it is detected that the temperature may exceed an upper threshold level. For example, the device may be arranged to reduce the electric field strength (e.g. by reducing the power of the electrical signal), reduce the pulse frequency, and/or turn off the pulsed electric field if it is determined that the temperature may exceed the upper threshold level. The device may be arranged to stop the treatment (i.e. turn off the pulsed electric field) if it is determined that the temperature has exceeded the upper threshold level. The device may be arranged to resume the treatment (i.e. recommence pulsing of the electric field) when it has been determined that the temperature has fallen below the upper threshold level and/or has fallen below a second, lower, threshold level (thereby allowing the treatment volume to cool down). The upper and/or lower threshold levels may be adjustable in dependence on the application. The upper threshold temperature may be lower than a temperature at which damage and/or death of the treated cells occurs due to heating (e.g. the upper threshold temperature may be lower than a temperature necessary for thermal ablation). In embodiments, the upper threshold level may be 41 degrees Celsius. In embodiments, the lower threshold level may be 38 degrees Celsius.

In embodiments, the pulsed electric field may be periodically turned on and off during treatment. Such on-off cycles may be in addition to a turning on and off of the electric field due to the pulsed nature of the electrical signal. Such on-off cycles may help reduce or eliminate temperature rises in the treatment volume. It will be understood that this may be just an example of how two different modulations can be combined to control the average power level of the signal.

In some embodiments, in particular where the average power of the electromagnetic signal is relatively low and no significant temperature rise is predicted, then there may be no need for temperature monitoring.

The temperature sensor may be a fibre optic temperature sensor. The fibre optic temperature sensor preferably has no metallic components in the region of the electric field. For example, only the optical fibre is in the region of the electric field. The temperature sensor may thereby leave the electric field substantially undistorted.

In alternative embodiments, a temperature sensor such as a thermistor may be provided to obtain an indication of the temperature of the treatment volume. In such an embodiment, preferably the temperature sensor is provided where the electric field is relatively low (i.e. significantly lower than its peak value). The temperature measurements may take place when the electromagnetic signal is off.

The temperature sensor may obtain an indication of the temperature of the treatment volume by detecting the temperature of the treatment volume directly, for example by being in contact with the treatment volume and/or by sensing electromagnetic radiation radiated directly from the treated volume. In alternative embodiments, the temperature sensor may obtain an indication of the temperature of the treatment volume indirectly, for example by detecting the temperature of a medium (e.g. tissue) surrounding the treatment volume. The temperature of the treatment volume may be estimated on the basis of the temperature of the surrounding medium.

The probe may comprise the temperature sensor. The probe may comprise a replaceable protective cap. The use of a replaceable protective cap may avoid the need to replace the whole probe after each use. The protective cap may accommodate both the transmitter and temperature sensor. The cap may act to hold the transmitter and temperature sensor together. Alternatively or additionally, a sleeve may be provided to hold the transmitter and temperature sensor together. Preferably, the transmitter and temperature sensor are held in a fixed relative position.

The temperature sensor may be integral with the transmitter. For example, in embodiments in which the transmitter is a coaxial cable, the temperature sensor may be provided between the inner conductor and outer conductor.

For example, the optical cable of a fibre optic temperature sensor may be provided between the inner conductor and outer conductor. In another example, the intermediate insulating layer, which is typically an opaque dielectric, may be an optically transparent dielectric material. The optically transparent dielectric material may act as the optical cable of the fibre optic temperature sensor.

The signal generator may comprise an amplifier to increase the power of the electrical signal so generated. Alternatively or additionally, an amplifier may be provided in addition to the signal generator to increase the power of the electrical signal received by the transmitter.

The impedance of the transmitter may be different from the impedance of the treatment volume. For example, the impedance of a coaxial cable may be 50 to 75 Ohms. The impedance mismatch may cause a portion of the electrical signal sent to the transmitter to be reflected back towards the signal generator. The proportion of the electrical signal that is reflected back may be unavailable for generating the electric field. The energy deposited into the treatment volume may be proportional to the power of the electrical signal that is used to generate the electric field (and not reflected back).

The device may be arranged to monitor the amount of the electrical signal that is delivered to the transmitter and/or reflected back from the transmitter. In particular, the device may be arranged to monitor the power of the electrical signal delivered to the transmitter and/or the power of the electrical signal reflected back from the transmitter. The device may be arranged to monitor the ratio of the delivered and reflected powers. The device may thereby obtain an indication of the energy deposited into the treatment volume.

The device may comprise a directional coupler. The directional coupler may be used to monitor the power deposited into the treatment volume. The directional coupler may be arranged to sense the electrical signal flowing towards the transmitter and sense the electrical signal reflected back from the transmitter. The directional coupler may output a first signal, the characteristics (e.g. amplitude) of which are dependent on the power of the electrical signal flowing towards the transmitter. The directional coupler may output a second signal, the characteristics (e.g. amplitude) of which are dependent on the power of the electrical signal reflected back from the transmitter. The outputs of the directional coupler may be fed to a receiver, for example a power meter, signal analyser and/or vector signal analyser.

The device may be arranged to monitor the electrical signal that flows towards and/or is reflected back from the transmitter at a particular frequency (e.g. at the signal frequency), at a plurality of (discrete) frequencies (e.g. at one or more harmonics of the signal frequency) and/or over a (continuous) range of frequencies. The monitoring may be performed by acquiring/sampling the first and/or second signal from the directional coupler at the desired frequencies. The signal generator may be arranged to generate an electrical signal composed of a plurality of signal frequencies, which may be close together, for example the signal frequencies may differ by less than 0.1%, e.g. by 1 MHz for a signal having a frequency in the GHz range. The device may be arranged to monitor the electrical signal that flows towards and/or is reflected back from the transmitter at one or more mixing frequencies of said plurality of signal frequencies. A mixing frequency ($f_m$) may be equal to a sum or difference of an integer multiple of each signal frequency (e.g. $f_m = Nf_1 \pm Mf_2$, where N and M are integers). The reflected signal at the harmonic and/or mixing frequencies may be used to obtain information about the properties of the material in the treatment volume.

The device may be arranged to regulate the treatment in dependence on the properties (e.g. power) of the electrical signal that is flowing towards and/or reflected back from the transmitter. For example, the treatment may be regulated in dependence on the outputs of the directional coupler (which may provide an indication of the energy delivered into the treatment volume). The treatment may be regulated by adjusting the electric field strength (e.g. by adjusting the power of the electrical signal), adjusting the pulse frequency, and/or turning off (completely or temporarily) the pulsed electric field, for example.

The device may require calibration. The calibration may ensure that the device is correctly reading the power of the electrical signal delivered to the transmitter and/or the power of the electrical signal reflected from the transmitter. The calibration may quantify the relationship between the outputs of the sensor(s) being used to monitor the delivered and/or reflected electrical signal (e.g. the outputs of the receiver/directional coupler), and the actual power of the electrical signal delivered to the transmitter and/or the power of the electrical signal reflected from the transmitter.

Calibration may be required because the transmitted and/or reflected signal may be measured a distance away from the transmitter. Therefore the electric signal may undergo certain changes, such as attenuation and/or phase changes, as it travels to and from the transmitter.

The calibration may provide a matrix of values, which are commonly referred as error coefficients, which relate the outputs of the sensor to the actual power values. The calibration may be carried out in multiple stages. Each stage may produce a matrix of error coefficients that are concatenated into a final matrix. The error coefficients may depend on the signal frequency. The calibration may be carried out for the, or each, signal frequency used in the treatment.

The calibration may be carried out by connecting the signal generator to a transmitter manufactured to certain standards, and which therefore has known characteristics. This may allow the use of bespoke short-, open- and match-standards. The calibration may be carried out using a transmitter of a commercially available standard. The commercially available standards may advantageously be traceable to national standards.

The error coefficients of the transmitter may be obtained from simulations in which the dimensions of the transmitter and its shape are exactly reproduced. Particularly in the case where the transmitter is a coaxial cable with precisely known dimensions, a constant shape and unchanged electrical performance (no matching network) during the treatment, a single set of simulated error coefficients may provide a highly accurate representation of the transmitter. The simulated error coefficients may be concatenated with error coefficients obtained from a calibration using a transmitter made to certain standards.

Such a two stage calibration process, using a transmitter manufactured to certain standards and simulations of the transmitter, may help maintain the sterility of the transmitter that is used in the treatment as no connections are necessary in the region of the treatment volume. The first stage of the calibration, using a transmitter manufactured to certain standards, may be carried out in advance of the treatment. By using phase-stable and high-quality cables, the calibration may hold for a number of hours or days.

The proportion of the electrical signal that is reflected back from the transmitter may depend on the impedance of the material adjacent the transmitter. The device may thereby also obtain an indication of the impedance of the material in the treatment volume. Different types of tissue have different impedances. Therefore, monitoring the amount of the electrical signal reflected back from the transmitter may: provide an indication of the type of tissue in the treatment volume, be used to verify correct positioning of the transmitter, and/or be used to guide the probe during insertion into the body (e.g. to provide an indication of position and/or orientation of the probe).

The dielectric coefficient, and therefore the impedance, of certain materials (e.g. tissue) may change with temperature. As a result, the magnitude and/or phase of the electrical signal that is reflected back from the transmitter may change with the temperature of the material in the treatment volume.

The device may be configured to determine the temperature of the material in the treatment volume by measuring the electrical signal that is reflected back from the transmitter. In particular, the device may be configured to determine the temperature of the material in the treatment volume by measuring the amount of the electrical signal that is reflected back from the transmitter (e.g. compared to the amount of electrical signal that is delivered to the transmitter). For example, the device may be configured to determine the temperature of the material in the treatment volume by comparing the delivered and reflected power (e.g. by computing a ratio of the delivered and reflected power), for example as determined from the output of the directional coupler.

A relationship between the amount of (e.g. the proportion of) the electrical signal reflected and the temperature of one or more materials (e.g. tissue types) may be predetermined and stored in the device. The stored relationship (e.g. in the form of a look-up table or formula) may be used by the device in said determination of temperature. In some cases, the reflection coefficient may be directly proportional to the temperature of the material in the treatment volume, at least within the working parameters of the device.

Using the amount of reflected signal to provide an indication of temperature may allow the treatment to be regulated in dependence on the temperature of the treatment volume (e.g. in the manner described above in respect of temperature measurement using a temperature sensor) without the need to provide the device with a temperature sensor.

The device may comprise an impedance matching network arranged to match the impedance of the transmitter and the impedance of the material in the treatment volume. The matching network may reduce the amount of the electrical signal that is reflected from the transmitter. The matching network may be adjustable to account for different impedances due to the tissue type and/or to account for any changes to the impedance due to changing temperature.

The device may include no impedance matching network. The absence of an impedance matching network may lead to creation of a stronger evanescent field. An impedance matching network may be used to increase the impedance mismatch, i.e. the impedance difference between the transmitter and the material in the treatment volume. Such an arrangement may be advantageous when the impedances of the transmitter and the material in the treatment volume are similar or the same. An increase in the mismatch may lead to creation of a more pronounced evanescent field.

The device may comprise a connector arranged to detachably connect the transmitter and the signal generator. The probe may be detachably connected, via a connector, to the signal generator. There may be a transmission line arranged to transmit the electrical signal from the signal generator to the transmitter. The connector may be arranged to detachably connect the transmitter to the transmission line. By providing an arrangement in which the transmitter/probe is detachably connected to the signal generator, the transmitter may be removed for sterilisation and/or replaced by the same or a different transmitter type.

The device may be powered by a battery. The device may be configured to be wearable by a patient. The device may comprise fasteners for attaching the device to a user. A battery powered and/or wearable device may be advantageous when treatment times are long, for example in excess of an hour, as it may allow the patient to be mobile whilst the treatment is delivered.

The device may be arranged to receive a flow of blood and pass the blood through the electric field. Such a device may be used to induce cell death in cancer cells in the blood of a patient, which may reduce the formation of metastasis. The blood flow may be received directly from the patient, or via a further machine. The device may be arranged to deliver the blood back to the patient, or pass the blood on to a further machine for further treatment.

The transmitter may generate an electromagnetic field comprising the electric field and an accompanying magnetic field. References to the electric field made herein may be replaced by references to an electromagnetic field.

The present invention provides, according to a second aspect, a kit of parts for a medical device for inducing cell death in cancer cells, for example a medical device according to the first aspect of the invention. The kit comprises: a signal generator arranged to generate a pulsed electrical signal having a pulse width of 0.1 µs to 1 ms, and a signal frequency of 10 MHz to 20 GHz; a connector coupled to the signal generator, for example via a transmission line; and a transmitter detachably connectable to the connector, the transmitter being arranged, when connected to the signal generator via the connector, to receive the electrical signal and transmit a time varying electric field in response to the electrical signal.

The present invention provides, according to a third aspect, a probe for a medical device, for example a medical device according to the first aspect of the invention. The probe may comprise a transmitter and a temperature sensor. The transmitter may be formed of a coaxial cable.

The present invention may provide, according to a fourth aspect, control software for a medical device, for example a medical device according to the first aspect of the invention. The control software is arranged to monitor a temperature value (e.g. from a temperature sensor and/or from measurements of the reflected electrical signal) and instruct a signal generator to generate a pulsed electrical signal having a pulse width of 0.1 µs to 1 ms and a signal frequency of 10 MHz to 20 GHz if the temperature value is below a threshold value.

The present invention provides, according to a fifth aspect of the invention, a method of using a medical device according to the first aspect of the invention to induce cell death in cancer cells. The method may be a method of inducing cell death in breast cancer cells, for example type MDA-MB-231 cells.

The present invention provides, according to a sixth aspect, a method of calibrating a medical device, for example a medical device according to the first aspect of the invention. The method may comprise a step of connecting the signal generator to a transmitter having known characteristics. The method may comprise a step of obtaining one or more error coefficients relating sensed values to the power received by the transmitter. The method may comprise a step of ascertaining one or more error coefficients obtained from a simulation of the transmitter. The method may comprise a step of concatenating the error coefficients obtained from the simulation with the error coefficients obtained from the transmitter having known characteristics.

The present invention provides, according to a seventh aspect, a method of operating a medical device. The device comprises a signal generator arranged to generate a pulsed electrical signal, and a transmitter arranged to receive the pulsed electrical signal and generate, in response to the electrical signal, an electric field in a treatment volume. The device may be a device according to the first aspect of the invention. The method comprises a step of operating the signal generator so as to generate the pulsed electrical signal, wherein the pulsed electrical signal received by the transmitter has a pulse width of 0.1 µs to 1000 µs, and a signal frequency of 10 MHz to 20 GHz. The method comprises a step of the transmitter generating the electric field in the treatment volume in response to the pulsed electrical signal so received.

The transmitter may have previously been placed at the site of a volume of cells to be treated. For example, the transmitter may have previously been placed at the site of cancer cells. The transmitter may have previously been positioned such that cancer cells are within the treatment volume.

The method may comprise a step of generating an evanescent field in the treatment volume in response to the pulsed electrical signal so received. The transmitter may have previously been positioned such that at least some of the cells to be treated are within a region in which the evanescent field is generated (e.g. within a penetration depth of the evanescent field).

The method may comprise a step of generating an electric field which causes a mechanical movement within at least part of the volume of cells to be treated (the mechanical movement being as a result of the influence of the electric field). The method may comprise a step of generating an electric field which causes mechanical pressure waves (e.g. sound waves) within the treatment volume. The electric field may comprise an evanescent field which causes the above mentioned mechanical movement/pressure waves.

The device may further comprise a temperature sensor. The method may comprise a step of obtaining an indication of the temperature of the treatment volume. The indication of temperature may be obtained from the temperature sensor and/or from measurements of the reflected electrical signal. The method may comprise a step of regulating the pulsed electrical signal received by the transmitter (and thereby regulating the electric field in the treatment volume) in dependence on the temperature value so obtained. For example, the method may comprise a step of regulating the power of the electrical signal received by the transmitter, and/or regulating whether the pulsed electric signal is to be generated or not, in dependence on the temperature value.

The method may comprise a step of monitoring a power of the electrical signal sent to the transmitter. The method may comprise a step of monitoring a power of a reflected electrical signal that is reflected from the transmitter. The method may comprise a step of regulating the electric field, for example by regulating the power of the electrical signal received by the transmitter, in dependence on the energy delivered to the treatment volume.

The present invention provides, according to an eight aspect, a method of inducing cell death. The method comprises a step of generating, for example using a transmitter, a pulsed time varying electric field in a treatment volume. The treatment volume comprises a volume of cells to be treated. The electric field has a pulse width of 0.1 µs to 1000 µs, and a signal frequency of 10 MHz to 20 GHz. The cells to be treated may comprise cancer cells, for example breast cancer cells. Such a method may thus be referred to as a method of treating cancer. The cells may be successfully treated when they have been sufficiently exposed to the electric field to cause death of the cells.

The method may comprise a step of selecting the pulse width, signal frequency, duty cycle, peak power level and/or mean power level. The method may comprise signal modulation that achieves similar differences between the peak and average signal values. Such variables may be selected in dependence on the type of cells (e.g. type of cancer cells) to be treated. The method may further comprise a step of determining the type of cells to be treated. For example, the method may comprise a step of determining the type of cancer cells present in a tumour to be treated.

A combination of peak power, average power and treatment duration may influence the number of cells that die after treatment. In an embodiment, a plurality of consecutive treatments may be carried out for a given volume of cells to be treated.

The method may comprise a step of monitoring the temperature of the volume of cells. The method may comprise a step of generating the electric field when the temperature is below an upper threshold value. The method may comprise a step of stopping the generation of the electric field when the temperature exceeds the upper threshold value. The cells are preferably not heated by more than 5 degrees Celsius, 4 degrees Celsius, or 3 degrees Celsius above their initial temperature, their initial temperature being their temperature before they are exposed to the electric field. The method may comprise a subsequent step of allowing the cells to cool to below a lower threshold value. The method may comprise a step of recommencing the generation of the electric field when the temperature falls below the lower threshold value.

The method may comprise a step of providing a probe comprising the transmitter. The method may comprise a step of positioning the probe such that the treatment volume contains the volume of cells to be treated. The method may comprise a step of positioning the transmitter such that the volume of cells to be treated are within a penetration depth of the electric field. The method may comprise a step of positioning the transmitter such that the volume of cells to be treated are within a penetration depth of the evanescent field.

The method may comprise a step of positioning the probe inside the body of a patient. The method may comprise a step of using an endoscope to position the probe.

The method may comprise a step of providing the transmitter on an external surface of a body of a patient.

The method may comprise a step of providing a plurality of transmitters, each transmitter generating a pulsed time varying electric field. The electric fields generated by the transmitters may be synchronised. The method may comprise a step of arranging the plurality of transmitters such that the electric fields generated by more than one transmitter combine in phase in the volume of cells to be treated.

The method may comprise a step of passing blood through the treatment volume. The method may be performed in combination with chemotherapy treatment. The method may be performed in combination with immunotherapy treatment. The method may form a part of a therapy that trains or stimulates the immune response of a patient.

It is envisaged that the method may also be used in the treatment of non-cancerous cells. For example, the method may be used to induce cell death in the cells of an adenoma or a solitary osteochondroma. The method may be used to reduce or occlude neovascularity in injured tendons. The method may be used to reduce varicose veins. In embodiments, the method may be a non-surgical and/or a non-therapeutic method.

The method may comprise a step of calibrating the device.

The present invention provides, according to a further aspect, a method of inducing cell death comprising using a transmitter to generate, in response to an electrical signal, an evanescent field in a volume of cells to be treated, such that the evanescent field causes a mechanical movement within at least part of the volume of cells to be treated. The method may include the mechanical movement causing mechanical pressure waves (e.g. sound waves) in a treatment volume larger than the volume affected by the evanescent field (e.g. larger the penetration depth of the evanescent field).

The present invention provides, according to a further aspect, a device for determining the temperature of a sample, the device comprising a transmitter configured to generate, in response to a time varying electrical signal, an electric field in the sample, wherein the device is configured to determine the temperature of the sample by measuring an electrical signal that is reflected back from the transmitter.

It will of course be appreciated that features described in relation to one aspect of the present invention may be incorporated into other aspects of the present invention. For example, the method of the invention may incorporate any of the features described with reference to the apparatus of the invention and vice versa. The characteristics of the electrical signal (e.g. values of signal frequency, pulse width, power, pulse frequency, and duty cycle) described in relation to the first aspect may be applicable to the other aspects of the invention described herein.

DESCRIPTION OF THE DRAWINGS

Embodiments of the present invention will now be described by way of example only with reference to the accompanying schematic drawings of which.

DETAILED DESCRIPTION

Figure 1A:
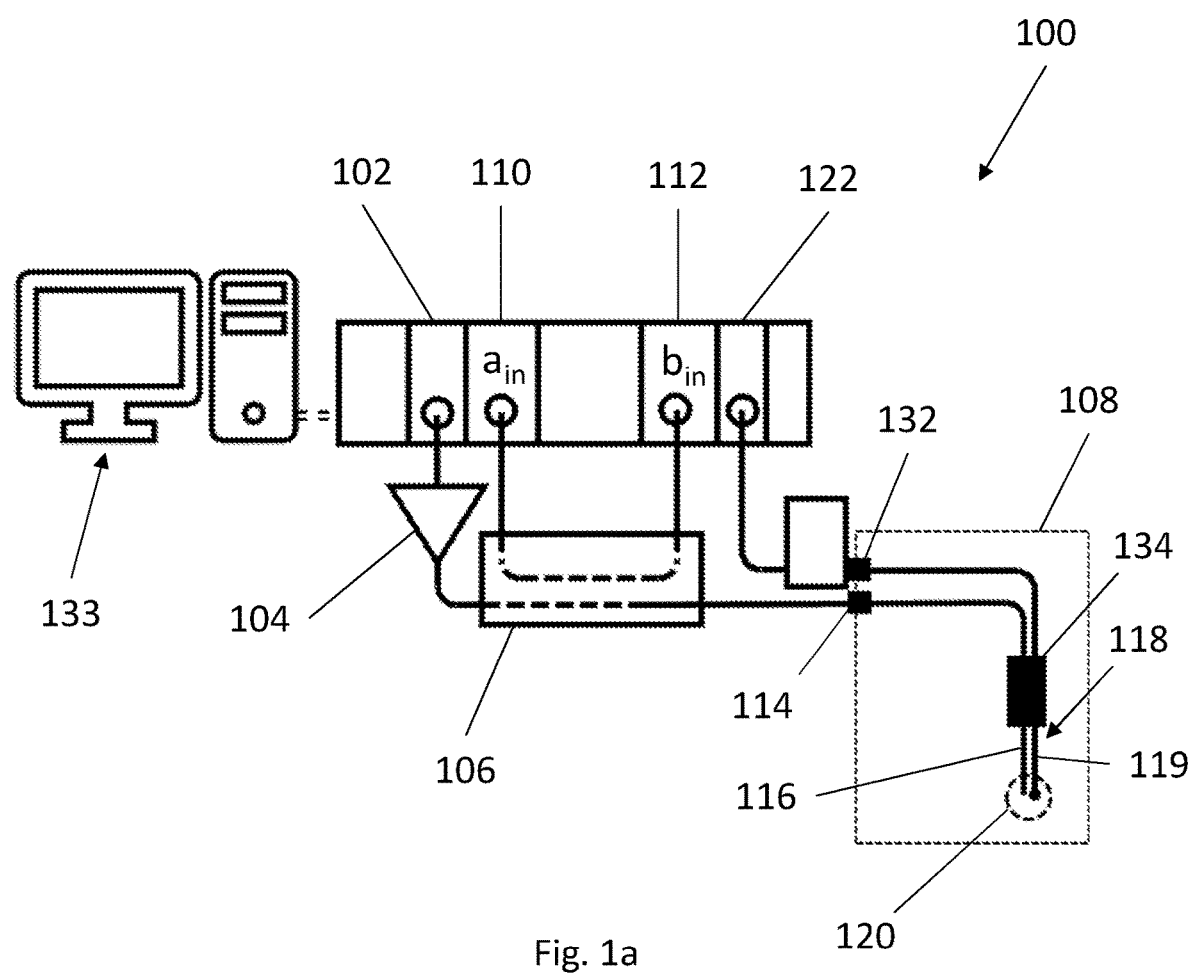
FIG. 1a shows a medical device according to a first embodiment of the invention.

FIG. 1a shows a medical device 100 according to a first embodiment of the invention. The medical device comprises a signal generator 102. The signal generator 102 is configured to generate a pulsed electric signal having a signal frequency of 10 MHz to 20 GHz, a pulse width of 0.1 μs to 1000 μs, and a duty cycle of 5% or less.

A power amplifier 104 is arranged to receive the pulsed electrical signal from the signal generator 102 and amplify the power of the pulsed electrical signal. In this embodiment, the amplifier is arranged to amplify the power such that the pulsed electrical signal has a peak power of 10 mW to 300 W.

A directional coupler 106 is arranged to receive the pulsed electrical signal from the power amplifier 104. The directional coupler 106 is arranged such that the pulsed electrical signal passes through the directional coupler 106 towards a transmitter 116.

The directional coupler 106 is arranged to output a first signal ($a_{in}$) and a second signal ($b_{in}$). The first signal ($a_{in}$) is proportional to the power of the electrical signal flowing towards the transmitter 116. The first signal ($a_{in}$) is acquired by a first receiver 110. The second signal ($b_{in}$) is proportional to the power of any electrical signal flowing back from the transmitter 116 towards the amplifier 104. The second signal ($b_{in}$) is acquired by a second receiver 112. The first receiver 110 and second receiver 112 are vector signal analysers that are arranged to measure the amplitude and phase of the first signal ($a_{in}$) and second signal ($b_{in}$), respectively.

The transmitter 116 is connected to the directional coupler 106 via a transmission line having a detachable connector 114. The detachable connector 114 allows the transmitter 116 to be replaced by a transmitter of the same or a different type.

In use, the pulsed electrical signal passes from the signal generator 102, via the amplifier 104 and directional coupler 106, to the transmitter 116, and the transmitter 116 generates an electric field in response to the pulsed electrical signal.

The electric field extends into a treatment volume. The treatment volume is a volume in which the electric field is deemed to be effective at inducing cell death. The size of the treatment volume may depend on, for example, the strength of the electric field, the signal frequency, the shape and dimensions of the transmitter 116, and/or the ability of the cells in the treatment volume to absorb energy from the electric field. The size of the treatment volume may also depend on the charged particles and/or ionic content of the cells in the treatment volume.

The amplitude difference between the first signal ($a_{in}$) and the second signal ($b_{in}$), i.e. the difference $|a_{in}|-|b_{in}|$, at a given frequency is proportional to the rate at which energy is deposited into the treatment volume. It will be appreciated that not all of the energy that is radiated from the transmitter will be absorbed within the treatment volume. The device 100 is arranged to monitor and record the rate at which energy is deposited into the treatment volume.

In embodiments, the device 100 is configured to instruct the signal generator 102 to temporarily stop generating the pulsed electrical signal if it is determined that the rate at which energy is absorbed and/or the amount of absorbed energy exceeds a threshold.

The ratio of the second signal ($b_{in}$) to the first signal ($a_{in}$), i.e. the ratio $b_{in}/a_{in}$, at a given frequency is dependent on the impedance of the material adjacent to the transmitter. The impedance varies with the type of tissue. The ratio between the first signal ($a_{in}$) and second signal ($b_{in}$) is therefore monitored and can be used to ascertain whether the transmitter 116 is in the desired position.

In embodiments, the receivers 110, 112 are arranged to acquire the first signal ($a_{in}$) and second signal ($b_{in}$) at the signal frequency of the pulsed electrical signal. In alternative embodiments, the first signal ($a_{in}$) and second signal ($b_{in}$) are additionally acquired over a plurality of frequencies, including one or more harmonic frequencies of the signal frequency. In further embodiments, the signal generator 102 generates a pulsed electrical signal composed of a plurality of signal frequencies that differ by 1 MHz, and the receivers 110, 112 are arranged to acquire the first signal ($a_{in}$) and second signal ($b_{in}$) at a plurality of mixing frequencies.

The device 100 further comprises a temperature sensor 118. The temperature sensor 118 is a fibre optic temperature sensor 118 comprising an optical cable 119 having a free end that is provided proximate the free end of the transmitter 116 so as to measure the temperature of the treatment volume. The use of a fibre optic temperature sensor 118 may be beneficial as it may have a low or no impact on the electrical field generated by the transmitter 116.

The temperature value is obtained by an acquisition card 122 that is in communication with the temperature sensor 118 via a detachable connector 132. The device 100 is configured to instruct the signal generator 102 to temporarily stop generating the pulsed electrical signal if the temperature of the treatment volume is determined to be above an upper threshold temperature. In this embodiment, the upper threshold temperature is 41 degrees Celsius. The device 100 is further configured to instruct the signal generator 102 to recommence generating the pulsed electric signal when the treatment volume is determined to have cooled down to below a lower threshold temperature. In this embodiment, the lower threshold temperature is 38 degrees Celsius.

Figure 1B:
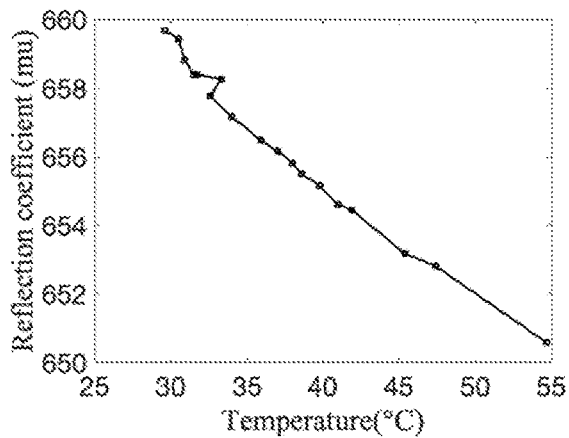
FIG. 1b is a graph showing reflection coefficient against temperature for an example tissue sample.
Figure 1C:
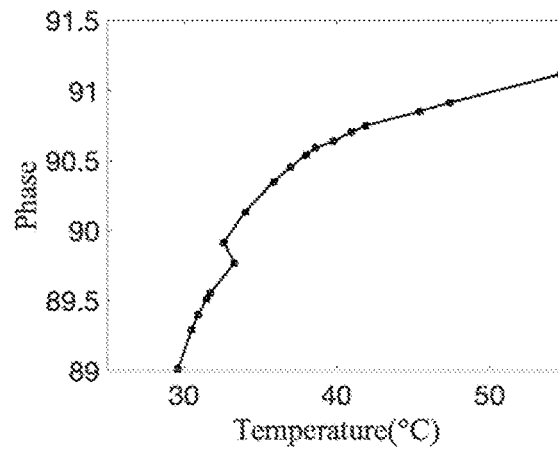
FIG. 1c is a graph showing phase of the reflected signal against temperature for an example tissue sample.

For at least some materials, the impedance changes with temperature in such a way that the changes can be monitored and used to provide an indication of the temperature in the treatment volume. As mentioned above, the impedance of the material in the treatment volume affects how much of the electrical signal is reflected back from the transmitter. FIGS. 1b and 1c show measurements made with commercially acquired pork tissue. FIG. 1b shows how the refection coefficient changes with temperature, and FIG. 1c shows how the phase of the reflected signal changes with temperature. As can be seen in FIG. 1b, the reflection coefficient appears to be directly proportional to the temperature of the sample over the measured temperature range. (The values at approximately 33 C are possibly uncorrelated due to a measurement error).

In embodiments, the relationship between temperature and the proportion of the electrical signal that is reflected back from the transmitter 116 is known for one or more tissue types. The relationship is stored in the device 100. The device 100 is configured to calculate the temperature of the material in the treatment volume using the stored relationship and a measurement of the electrical signal reflected back from the transmitter 116. More particularly, the device 100 contains stored information providing a relationship between temperature and the ratio $b_{in}/a_{in}$. The device 100 is configured to calculate the temperature of the material in the treatment volume using the stored relationship and measurements of $a_{in}$ and $b_{in}$.

In some embodiments, where the temperature can be calculated using measurements of the reflected electrical signal, the temperature sensor 118 is omitted from the device. In some embodiments, the temperature may be measured using both the temperature sensor and the reflected electrical signal. The measurements by the temperature sensor may be used to validate and/or calibrate the temperature value determined using measurements of the reflected electrical signal.

Together, the transmitter 116 and the temperature sensor 118, or at least the optical cable 119 thereof, form a probe 108. The probe 108 further comprises a handle 134 by which the probe 108 can be held. In embodiments, the handle 134 comprises a control switch for operating the device 100. The tip of the probe 108, which is defined by the free ends of the transmitter 116 and optical cable 119, is indicated generally by circle 120.

Figure 2:
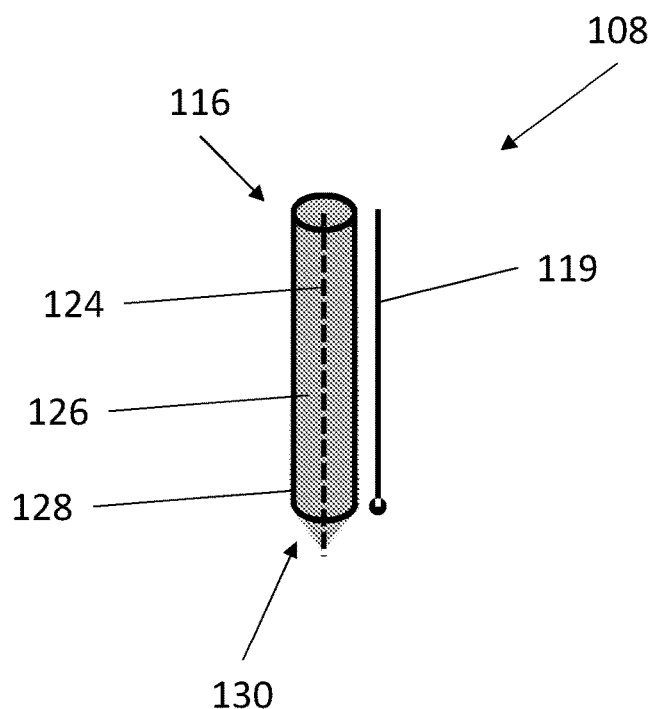
FIG. 2 shows a probe of the medical device according to the first embodiment of the invention.

FIG. 2 shows the tip of the probe 108 in more detail. The transmitter 116 is formed of a coaxial cable comprising an inner metal wire 124 that is surrounded by a dielectric material 126 that is, in turn, surrounded by an outer metal conductor 128. The coaxial cable has a free end that has been sharpened such that the free end tapers to a point 130. The pointed end may aid insertion of the transmitter 116 into tissue.

The electric field is formed at the free end of the coaxial cable between the inner conductor 124 and the outer conductor 128 which, as a result of the electrical signal, come to be at different voltages. The strength and direction of the electric field varies with time as the relative voltages of the inner conductor 124 and outer conductor 128 varies.

Figure 3A:
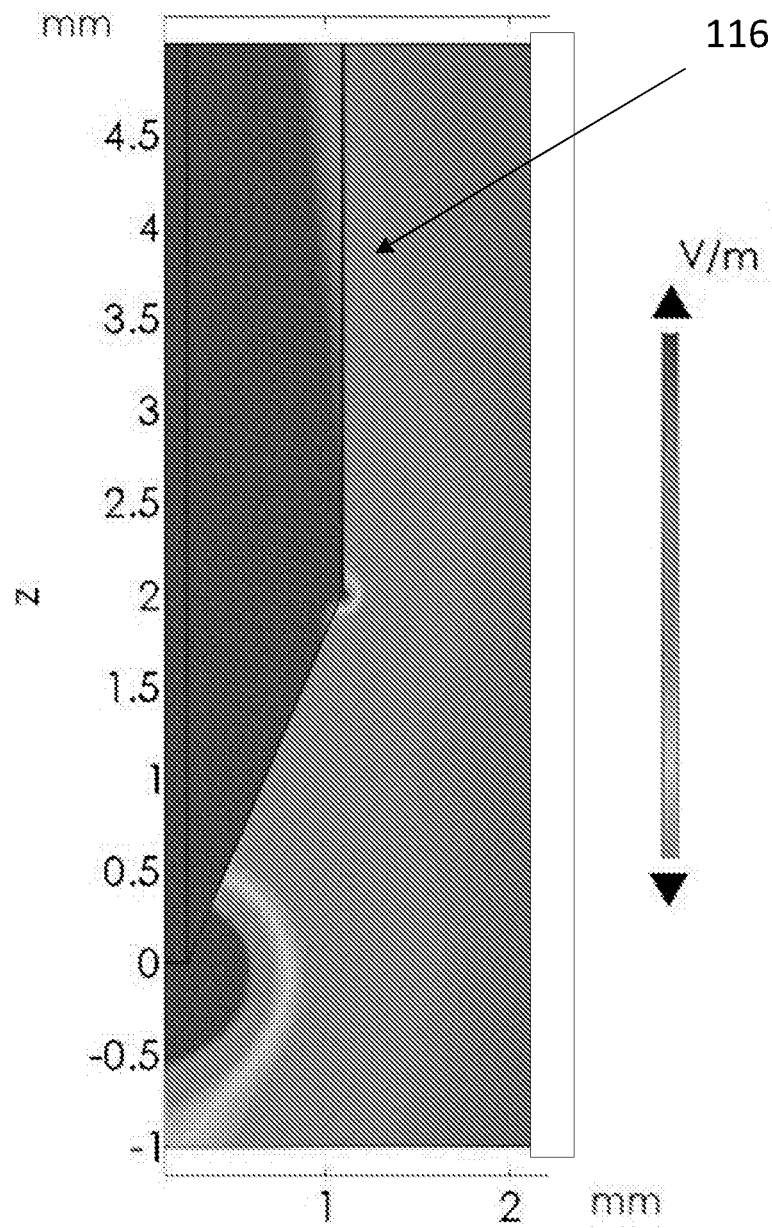
FIG. 3a shows a simulation of an electric field generated by the probe according to the first embodiment of the invention.

FIG. 3a shows a simulation of the electric field generated by the transmitter 116 in response to an electrical signal having a frequency of 2.2 Gigahertz. The transmitter 116 shown is formed from an RG-405 coaxial cable. FIG. 3a shows how the electric field strength varies with distance from the transmitter 116. As can be seen, the strongest electric field surrounds the distal end of the coaxial cable where the inner conductor 128 is exposed.

Figure 3B:
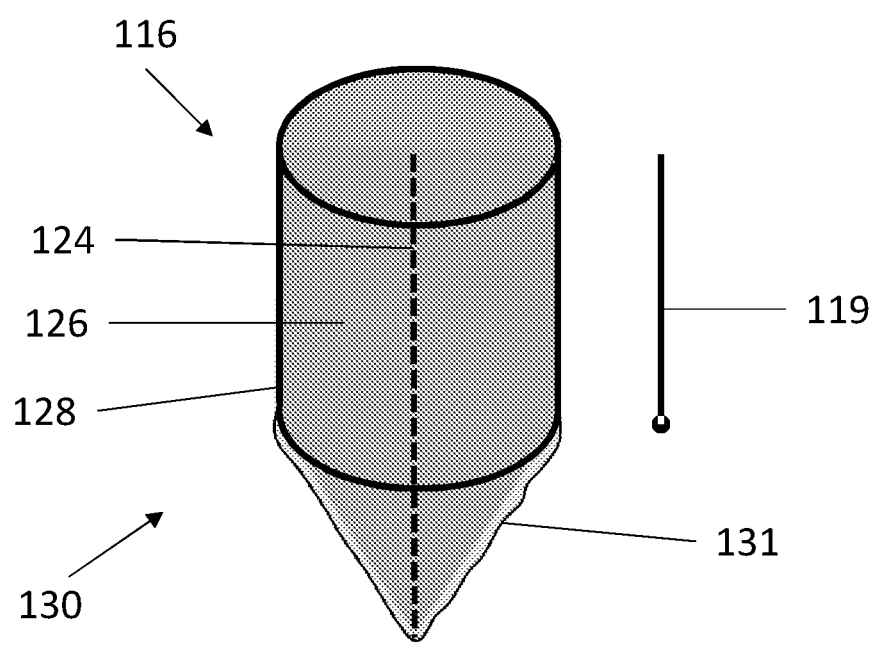
FIG. 3b shows a schematic representation of a volume in which an evanescent field is generated.

FIG. 3b shows a schematic representation/artistic depiction of a volume at the surface of the transmitter 116, an evanescent field 131 being present in the volume when the transmitter 116 generates an electric field in response to an electrical signal.

Figure 15:
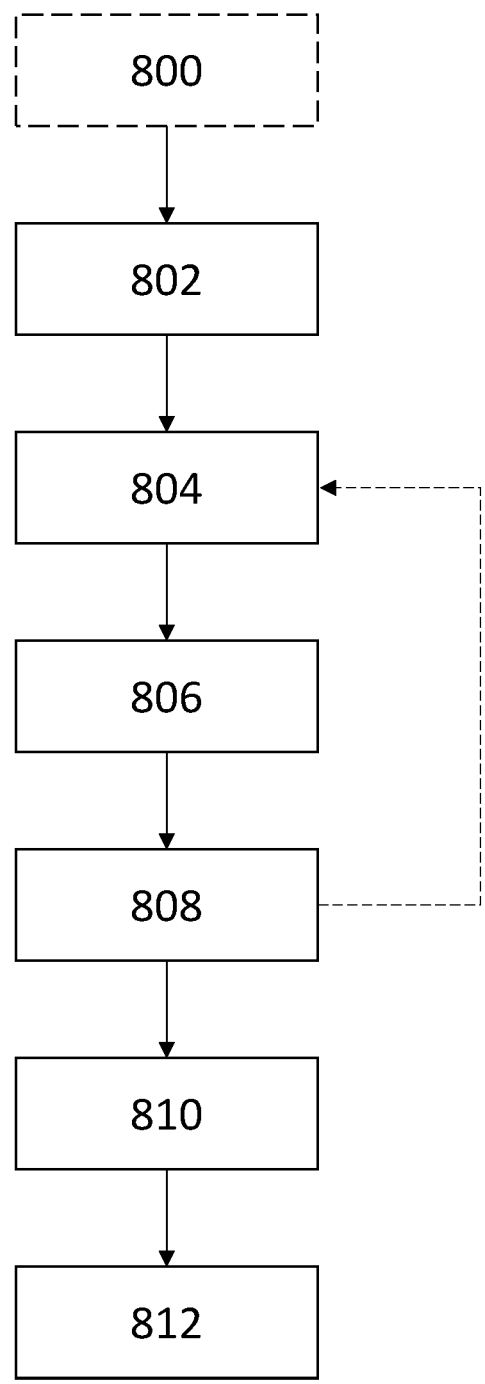
FIG. 15 is a flow chart of a method of inducing cell death using the medical device of the first embodiment of the invention

A method of inducing cell death using the device 100 will now be described with reference to FIG. 15. The tip of the probe 108 is inserted (step 802) into tissue such that the cells to be treated are located within the treatment volume. For example, the tip of the probe 108 is inserted into or near a cancerous tumour, such that the cancer cells are within the treatment volume. In embodiments, an endoscope may be used to guide the insertion. The device 100 may comprise the endoscope, or the endoscope could be provided separately. In embodiments, the tip of the probe 108 is positioned such that at least some of the cells to be treated are located in a region in which an evanescent field is generated.

The signal generator 102 generates (step 804) a pulsed electrical signal. The signal frequency, pulse width and duty cycle (pulse frequency) have each been selected. For example, the signal frequency is selected to be 2.2 Gigahertz, the pulse width is selected to be 50 microseconds, and the duty cycle is selected to be 5%.

The power amplifier 104 amplifies (step 806) the output from the signal generator 102. The level of amplification has also been selected. For example, the amplification is selected such that the average power of the electrical signal is 2 Watts. In embodiments, a power level is set and adjusted by the signal generator 102 before being amplified by the power amplifier 104. There may be a preceding step of selecting the signal frequency, pulse width, duty cycle, and peak power level in dependence on the type of cells being treated.

The temperature of the treatment volume is monitored (step 808) by the temperature sensor 118. If the temperature exceeds the upper threshold level, the signal generator is instructed to stop generating the electrical signal until the temperature has dropped below the lower threshold level. In alternative embodiments, the temperature of the treatment volume is additionally or alternatively monitored using measurements of the reflected electrical signal; the reflected signal being compared to the injected signal, e.g. by calculating the ratio between reflected and injected signal levels.

The outputs from the directional coupler 106 are also monitored (step 810) to monitor the rate at which energy is delivered into the treatment volume. The impedance of the treatment volume may also be calculated to determine if the probe 108 is correctly positioned. In embodiments, if the amount of energy delivered into the treatment volume or the rate at which energy is delivered into the treatment volume is determined to have exceeded a threshold level, the signal generator is instructed to stop generating the electrical signal until the temperature has dropped below the lower threshold level.

The treatment time (exposure time) is selected on the basis of the mean power of the electrical signal, the rate at which energy is being delivered into the treatment volume, and the type of cells being treated. When the treatment time has elapsed, the signal generator stops generating the electrical signal and the probe is withdrawn (step 812) from the tissue. In alternative embodiments, the treatment time is determined by the amount of energy that is delivered to the treated volume.

The device 100 may require a calibration (step 800) prior to use. In particular, it may be necessary to quantify the relationship between the first signal ($a_{in}$) and the second signal ($b_{in}$) from the directional coupler 106, and the power delivered to the transmitter ($a_p$) and reflected from the transmitter ($b_p$). The calibration comprises attaching a probe manufactured to a commercially available standard to the connector 114. The calibration is then performed to obtain a matrix of error coefficients which defines the relationship between the first and second signals and the delivered and reflected powers. An equation showing this relationship is shown below:

$$\begin{bmatrix} b_{in} \\ b_P \end{bmatrix} = \begin{bmatrix} e_{00} & e_{01} \\ e_{10} & e_{11} \end{bmatrix} \begin{bmatrix} a_{in} \\ a_P \end{bmatrix}$$

The error coefficients obtained from the calibration using the standard probe may be concatenated with error coefficients obtained from a simulation of the behaviour of the probe 108.

In the first embodiment, the signal generator 102, receivers 110, 112 and acquisition card 122 are all located in a single chassis that provides support for their interconnection, synchronisation, data transfer, and signal conditioning. A computer interface 133 is provided, through which the device is controlled. In alternative embodiments, the instruments are provided separately, with external cabling to provide functionality such as triggering.

FIGS. 4, 5, 6 and 7 show alternative embodiments of the probe 108.

Figure 4:
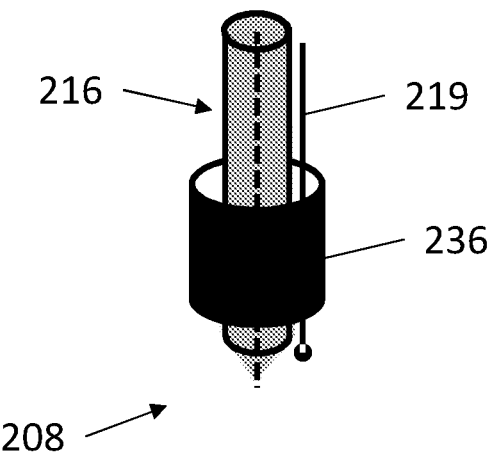
FIGS. 4 to 7 show alternative embodiments of the probe according to the first embodiment of the invention.

FIG. 4 shows an embodiment in which a probe 208 comprises a transmitter 216 in the form of a coaxial cable, and an optical cable 219 of a fibre optic temperature sensor. The probe further comprises a sleeve 236 to hold together the free ends of the coaxial cable and the optical cable 219.

Figure 5:
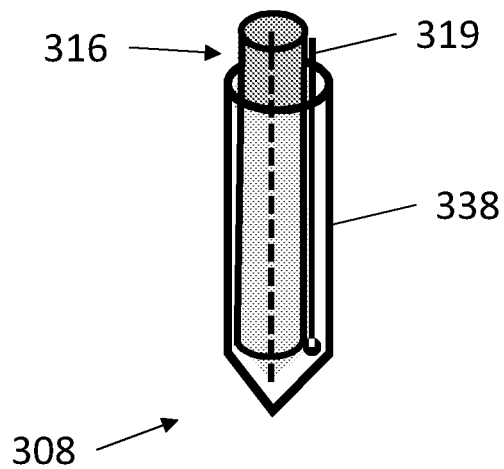

FIG. 5 shows an embodiment in which a probe 308 comprises a transmitter 316 in the form of a coaxial cable, and an optical cable 319 of a fibre optic temperature sensor. The probe further comprises a protective cap 338 arranged to fit over the free ends coaxial cable and optical cable 319 so as to retain them in position. The protective cap 338 is replaceable. This may be beneficial as it may only be necessary to replace the protective cap 338 after each use, rather than the whole probe 308, in order to maintain a sterile environment.

Figure 6:
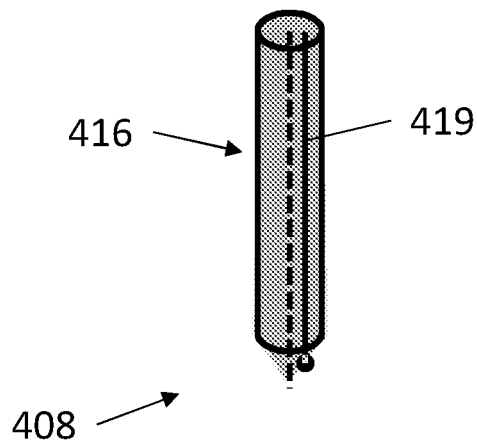

FIG. 6 shows an embodiment in which a probe 408 comprises a transmitter 416 in the form of a coaxial cable, wherein an optical cable 419 of a fibre optic temperature sensor is integrated within the coaxial cable. The optical cable 419 passes between the inner conductor and outer conductor of the coaxial cable. The end of the optical cable 419 emerges at the tapered end of the coaxial cable.

Figure 7:
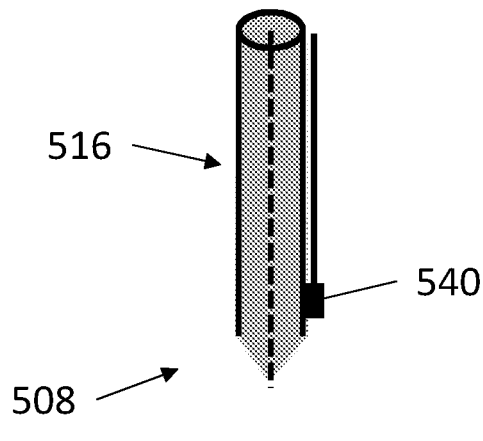

FIG. 7 shows an embodiment in which a probe 508 comprises a transmitter 516 in the form of a coaxial cable. A thermistor 540 is mounted proximate the free end of the coaxial cable. The thermistor 540 is positioned at a location where the electric field is relatively low so that the electric field generated by the transmitter 516 does not adversely affect operation of the thermistor 540 and/or the thermistor 540 does not influence the electric field in the treatment volume. The thermistor 540 thereby detects the temperature at a position slightly away from the treatment volume.

Figure 8:
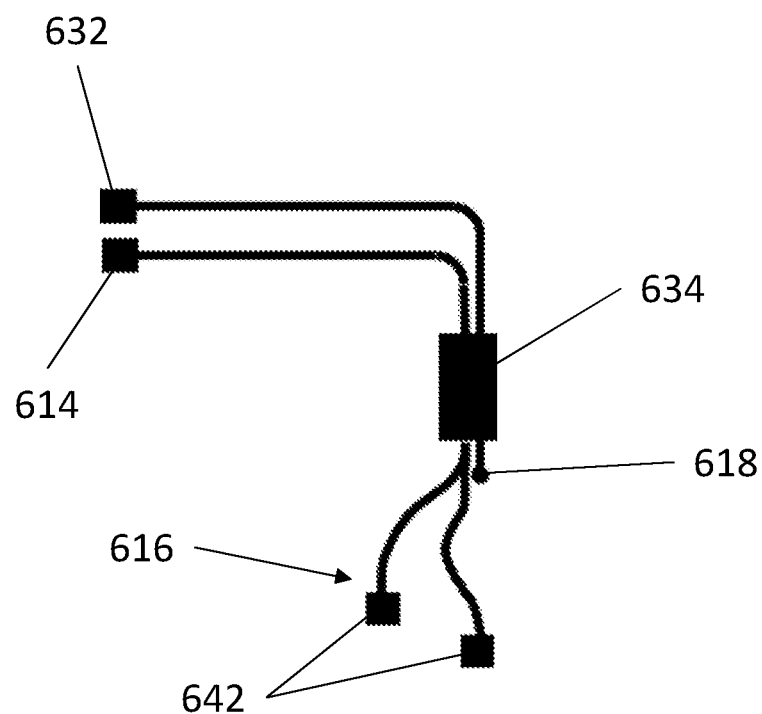
FIG. 8 shows an alternative embodiment of the invention comprising patch antennas.

FIG. 8 shows an alternative embodiment in which a transmitter 616 comprises two patch antennas 642 arranged to be placed on a surface of the body. For example, the patch antennas may be placed on a surface of the skin. The patch antennas 642 are arranged to generate an electric field in a treatment volume below the surface on which they are placed. A fibre optic temperature sensor 618 is also provided and can be used to monitor the temperature of the treatment volume. The fibre optic temperature sensor can be manipulated with handle 634.

The transmitter 616 and temperature sensor 618 are provided with connectors 614 and 632 of the same type as the connectors 114 and 132 of the first embodiment. Thus the transmitter 616 and temperature sensor 618 can be used interchangeably with the probe 108.

In use, the patch antennas 642 receive the same electrical signal from a signal generator. Therefore the electrical field generated by the two patch antennas 642 is synchronised. In embodiments, more patch antennas 642 may be provided to increase the overall size of the treatment area. In embodiments, the patch antennas 642 can be positioned such that the electric field generated by each antenna 642 combines in phase in a volume of cells to be treated.

Figure 9:
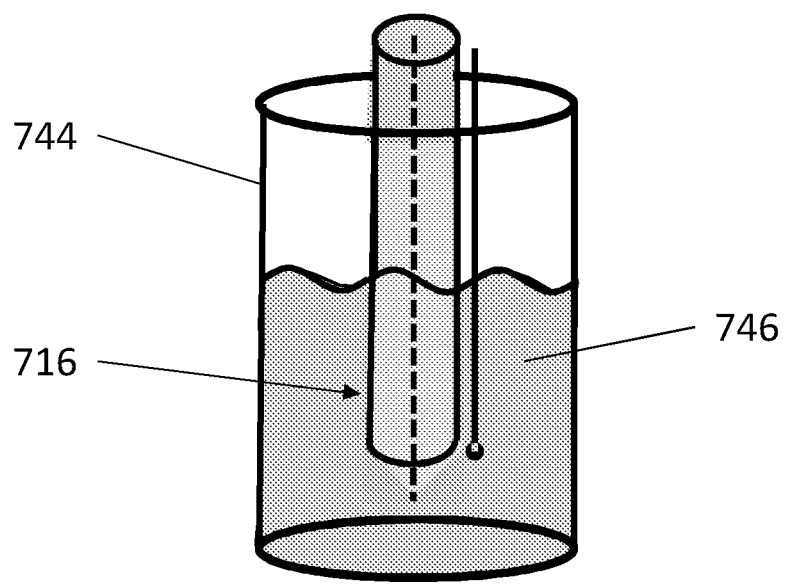
FIG. 9 shows an experimental set up in which a medical device according to the invention is used to induce cell death in cancer cells that are suspended in a liquid.

In an initial trial, a medical device according to the invention was used to induce cell death in cancer cells that were suspended in a liquid. FIG. 9 shows the experimental set up. A vessel 744 having a diameter of approximately 5 mm was partly filled with a liquid 746 comprising human breast cancer cells of type MDA-MB-231 suspended in a DMEM/F12 cell culture medium with 10% FCS and antibiotics. A transmitter 716 formed of an RG-402 semi-rigid coaxial cable with a diameter of 2 mm was inserted into the vessel 744. A free end of the transmitter 716 was submerged in the liquid 746 and positioned a few millimetres above the bottom of the vessel 744. The free end was shaped so as to taper to a point. The electric field, when generated, was therefore radiated into a bottom part of the vessel 744.

Several treatments were carried out with the electrical signal having various pulse widths, signal frequencies and power levels. Differential staining was used to investigate the condition of the cells.

Figure 10:
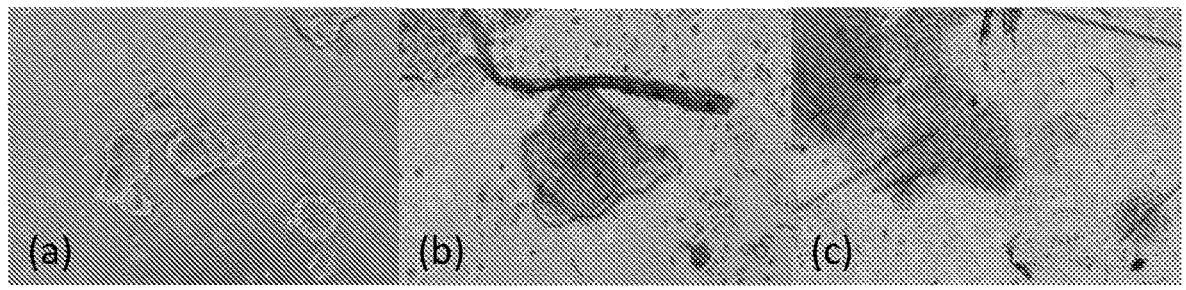
FIG. 10 shows a microscopic view of cancer cells at 10× optical zoom (a) before a treatment (b) immediately after the treatment, and (c) 24 hours after the treatment.

It was observed that immediately after treatments, the cancer cells still looked relatively healthy. In successful treatments, cell death started as soon as 2 to 3 hours after treatment. After 24 hours, the cell death rate typically increased to 60-80% and most cancer cells had lost cohesion. FIG. 10 shows a microscopic view of the cancer cells at 10× optical zoom (a) before treatment (b) immediately after treatment, and (c) 24 hours after treatment. Before and immediately after treatment (FIGS. 10(a) and (b)) the cell membrane appears to be undamaged. 24 hours after treatment (FIG. 10(c)) the cell membrane has broken down, indicating the cell death has occurred. The apparent lack of damage to the cell membrane immediately after treatment seems to indicate that the treatment does not damage the cell membrane directly, e.g. due to heating. It is thought that the cell membrane is caused to break down due to an apoptosis process (programmed cell death).

Figure 11:
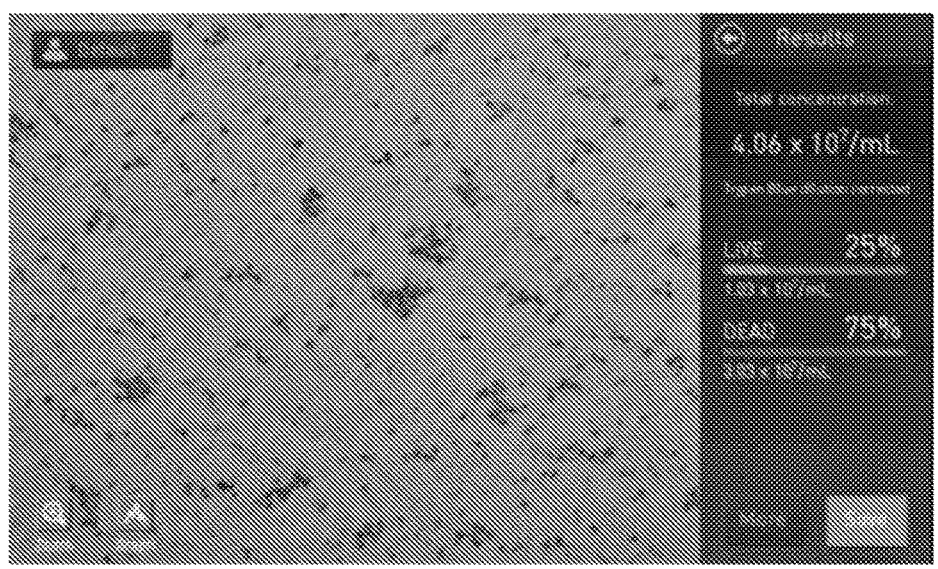
FIG. 11 shows an example of a cell death count 24 hours after a successful treatment.

FIG. 11 shows an example of the cell death count 24 hours after a successful treatment. From a total concentration of $4.06 \times 10^7$/mL, 25% of the cells were deemed to be live ($1.03 \times 10^7$/mL) and 75% of the cells were deemed to be dead ($3.03 \times 10^7$/mL).

It is thought that convection currents due to small temperature variations within the liquid resulted in cells being transported around the vessel 744 and into close proximity to the free end of the transmitter, where the electric field is strongest. This may have helped increase the proportion of cells which died, despite a relatively small proportion of the cells being in close proximity to the free end of the transmitter 716 at any given time. Another explanation is cell death signalling between the cells.

Figure 12:
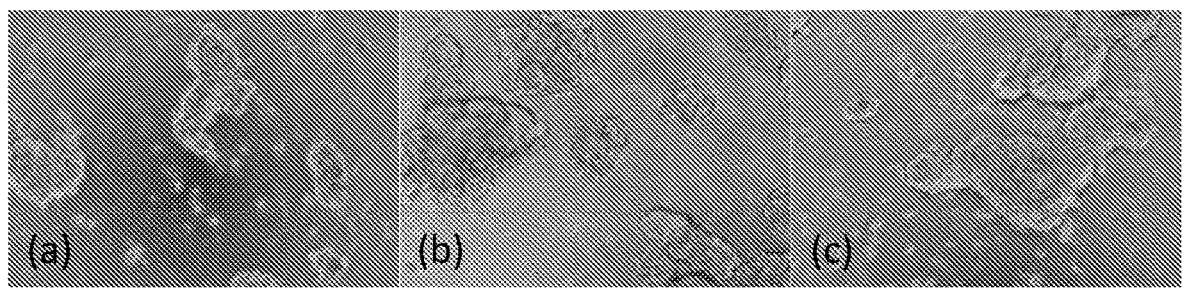
FIG. 12 shows a microscopic view of cancer cells at 10× optical zoom (a) before heating (b) immediately after heating and (c) 24 hours after heating in a water bath at 50° C., with no exposure to the electric field.

Control samples with the same type of cells suspended in the liquid did not show any significant cell death rate. FIG. 12 shows a microscopic view of the cancer cells at 10× optical zoom (a) before heating (b) immediately after heating and (c) 24 hours after heating in a water bath at 50° C., with no exposure to the electric field. As can be seen, the cells appear to remain relatively healthy and the cell membranes appear to remain undamaged. The method may provide a selective treatment where cell death is induced in cancer cells, and non-cancer cells are unaffected.

The investigations showed that successful treatment occurred with pulse widths in the range 50 μs±67%. Signal frequencies of 2 GHz to 5.8 GHz were successfully used with little or no impact on the efficacy of the method. The duration of the treatment had to be adjusted depending on the power of the electrical signal. For peak power levels of 1 W, an exposure time of 6-8 hrs was required. At peak power levels of 50 W, an exposure time of 3-15 mins was found to be sufficient.

To determine any effects the treatment might have on the distribution of membrane associated cell death proteins, Caspase 9 staining was carried out and showed markedly increased levels. This demonstrates that a cell death mechanism has been started within the treated cells.

A standard peroxidase assay was also used to assess whether peroxidase production was responsible for the apparent cell death observed after the treatment. From the triplicate repeats of positive controls of the peroxidase assay, it was seen that peroxidase concentration decreases. However, the treated samples did not follow this trend. Therefore, it was concluded that it is unlikely peroxidase is the main mechanism of causing the particular cancer cells to die.

To expand on the investigation, a protein microarray was conducted on 945 protein and kinases from treated cells immediately after exposure to the electric field and after a waiting period of 2 hours. Table 1 shows the proteins significantly upregulated after the 2 hour period compared to an untreated control sample. Table 2 shows the proteins significantly downregulated after the 2 hour period compared to the untreated control sample. The results reveal a significant impact on the proteins that form part of the signalling pathways within the cells, and which affect the cell membranes and the cell cycle management and apoptosis process.

TABLE 1

Proteins upregulated after treatment
% Change From Control (CFC)

| Protein Target Name | % CFC |
|---|---|
| Abl (Abl1) | 28 |
| Akt2 (PKBb) | 11 |
| BRCA1 | 11 |
| BRCA1 | 15 |
| Catenin a | 18 |
| Catenin b1 | 16 |
| Caveolin 1 | 28 |
| CDK1 (CDC2) | 16 |
| CDK1 (CDC2) | 13 |
| CK2a1 (CSNK2A1) | 12 |
| Cofilin 2 | 18 |
| CREB1 | 11 |
| CSF1R (Fms) | 52 |
| Csk | 24 |
| Cyclin B1 (CCNB1) | 16 |
| Cyclin E1 (CCNE1) | 30 |
| PRKDC (DNAPK) | 24 |
| DYRK2 | 19 |
| EFNB2 | 65 |
| EGFR(ErbB1) | 13 |
| EGFR(ErbB1) | 10 |
| EGFR(ErbB1) | 24 |
| EGFR(ErbB1) | 30 |
| EGFR(ErbB1) | 11 |
| eIF2a | 15 |
| EphA1 | 13 |
| ERK1 (MAPK3) | 18 |
| ERK1 (MAPK3) | 23 |
| ERK1 (MAPK3) | 52 |
| Ezrin | 11 |
| FGFR2 (BEK) | 11 |
| Fos | 21 |
| Gab1 | 48 |
| HDAC5 | 12 |
| HGK (ZC1) | 26 |
| Histone H3 | 18 |
| IkBa | 13 |
| IkBa | 27 |
| IkBb | 13 |

TABLE 1-continued

Proteins upregulated after treatment
% Change From Control (CFC)

| Protein Target Name | % CFC |
|---|---|
| IKKa (IkBKA) | 31 |
| IRS1 | 43 |
| JAK1 | 20 |
| JAK1 | 11 |
| JAK3 | 10 |
| JAK3 | 29 |
| JNK1 (MAPK8) | 33 |
| Jun | 12 |
| Jun | 29 |
| Kit | 21 |
| Ksr1 | 22 |
| MST1 (STK4, Krs2) | 10 |
| LKB1 (STK11) | 17 |
| LKB1 (STK11) | 11 |
| MAPKAPK2 | 38 |
| MARK1 | 18 |
| MARK3 | 13 |
| MEK2 (MKK2, MAP2K2) | 17 |
| MKK3 (MEK3, MAP2K3) | 12 |
| MKK3 (MEK3, MAP2K3) | 15 |
| MEK5 (MKK5, MAP2K5) | 25 |
| MEKK1 (MAP3K1) | 13 |
| MEKK1 (MAP3K1) | 14 |
| MKK3 (MEK3, MAP2K3) | 14 |
| MKK7 (MEK7, MAP2K7) | 22 |
| MLK3 | 17 |
| Mos | 13 |
| MST1 (STK4, Krs2) | 14 |
| mTOR (FRAP) | 16 |
| Myc | 27 |
| MyoD | 49 |
| Nek7 | 18 |
| NFkappaB p50 | 35 |
| NFkappaB p65 (Rel A) | 31 |
| p38a MAPK (MAPK14) | 14 |
| p38b MAPK (MAPK11) | 16 |
| p38b MAPK (MAPK11) | 24 |
| p38d MAPK (MAPK13) | 16 |
| p38g MAPK (MAPK12, ERK6) | 16 |
| p53 | 23 |
| p53 | 28 |
| p53 | 20 |
| S6Ka (RPS6KB1) | 17 |
| p70S6K (RPS6KB1) | 15 |
| p70S6KB (RPS6KB2) | 28 |
| PAK1 (PAKa) | 19 |
| PDGFRb | 19 |
| PDK1 (PDPK1) | 20 |
| PDLIM5 (LIM) | 16 |
| PED15 (PEA15) | 19 |
| PKCd (PRKCD) | 23 |
| PKCe (PRKCE) | 18 |
| PKCe (PRKCE) | 25 |
| PKCg (PRKCG) | 30 |
| PKCh (PRKCH) | 20 |
| PKCm (PRKCM, PRKD1, PKD1) | 27 |
| PKCm (PRKCM, PRKD1, PKD1) | 16 |
| PKCq (PRKCQ) | 11 |
| PKCm (PRKCM, PRKD1, PKD1) | 29 |
| PRK1 (PKN1) | 18 |
| PLCG2 (PLC R) | 23 |
| Plk4 (SAK; STK18) | 12 |
| PYK2 (PTK2B) | 16 |
| RSK1 (RPS6KA1, p90RSK) | 19 |
| RSK1 (RPS6KA1, p90RSK) | 34 |
| RP'S6 | 18 |
| S6Ka (RPS6KB1) | 57 |
| S6Ka (RPS6KB1) | 61 |
| Shc1 | 72 |
| SIK3 (QSK) | 11 |
| SIK3 (QSK) | 24 |
| SIK3 (QSK) | 40 |
| SIT | 30 |
| SIT | 30 |
| SLK | 17 |
| Smad1 | 17 |
| Smad2 | 18 |
| Smad2 | 27 |
| SMC1 | 28 |
| SMG1 | 12 |
| SNCA (a-Synuclein) | 18 |
| snRNP 70 | 11 |
| Src | 24 |
| Src | 28 |
| Src | 15 |
| Src | 52 |
| Src | 21 |
| SRPK2 | 16 |
| STAT1a/b | 31 |
| STAT2 | 29 |
| STAT2 | 71 |
| STAT3 | 50 |
| STAT3 | 30 |
| STAT5A | 32 |
| STAT5A | 26 |
| STAT5A | 21 |
| STAT5B | 12 |
| Syk | 12 |
| Syk | 14 |
| TAK1 | 22 |
| Tau | 15 |
| Tau | 23 |
| Tau | 22 |
| TBC1D7 | 30 |
| TBK1 | 23 |
| TBK1 | 12 |
| TrkB (NTRK2) | 15 |
| TTK | 14 |
| TYK2 | 24 |
| Tyro3 | 15 |
| Tyrosine Hydroxylase | 30 |
| VEGFR2 (KDR) | 13 |
| VEGFR2 (KDR) | 12 |
| VEGFR2 (KDR) | 16 |
| WASP | 19 |
| Wee1 | 12 |
| WNK1 | 23 |
| YSK1 (STK25, SOK1) | 13 |
| ZAP70 | 13 |
| ZAP70 | 22 |

TABLE 2

Proteins downregulated after treatment
% Change From Control (CFC)

| Protein Target Name | % CFC |
|---|---|
| Abl (Abl1) | −17 |
| Abl (Abl1) | −16 |
| Akt1 (PKBa) | −16 |
| AMPKa2 (PRKAA2) | −13 |
| APP | −33 |
| ASK1 (MAP3K5) | −12 |
| AurKB (Aurora B, AIM-1) | −14 |
| B23 (NPM) | −19 |
| BARK1 (GRK2, ADRBK1) | −14 |
| Bmx (Etk) | −12 |
| BRD2 | −12 |
| BRK (PTK6) | −13 |

TABLE 2-continued

Proteins downregulated after treatment
% Change From Control (CFC)

| Protein Target Name | % CFC |
|---|---|
| CaMK1d | −24 |
| Catenin b | −18 |
| Catenin b | −17 |
| Catenin b1 | −15 |
| CDC7 | −23 |
| CDK1 (CDC2) | −18 |
| CDK1 (CDC2) | −30 |
| CDK10 | −24 |
| CDK12 (Cdc2L7) | −14 |
| CDK1 (CDC2) | −24 |
| CDK2 | −28 |
| CDK4 | −21 |
| CDK5 | −14 |
| CDK5 | −26 |
| CDK6 | −19 |
| CDK6 | −21 |
| CDK6 | −25 |
| CDK7 | −13 |
| CDK7 | −29 |
| CDK7 | −20 |
| CDK9 | −23 |
| CDK9 | −21 |
| Chk1 (CHEK1) | −13 |
| Chk1 (CHEK1) | −29 |
| Chk1 (CHEK1) | −17 |
| Chk1 (CHEK1) | −17 |
| Chk1 (CHEK1) | −18 |
| Chk2 (CHEK2) | −12 |
| Chk2 (CHEK2) | −19 |
| Chk2 (CHEK2) | −23 |
| CK2a1 (CSNK2A1) | −12 |
| Crystallin aB (HspB5; CRYA2; CRYAB) | 17 |
| Csk | −14 |
| EGFR (ErbB1) | −12 |
| EphA2 | −13 |
| ErbB2 (HER2, Neu) | −12 |
| ERK1 (MAPK3) | −16 |
| FAK (PTK2) | −13 |
| FAK (PTK2) | −17 |
| GFAP | −20 |
| GluR1 | −45 |
| GSK3b | −17 |
| ICK | −12 |
| IkBe | −14 |
| Kit | −14 |
| MEK2 (MKK2, MAP2K2) | −18 |
| MEKK2 (MAP3K2) | −13 |
| MST3 (STK24) | −15 |
| NMDAR2B (GRIN2B) | −23 |
| p53 | −17 |
| S6Ka (RPS6KB1) | −18 |
| p70S6K (RPS6KB1) | −15 |
| p70S6K (RPS6KB1) | −12 |
| PAK1 (PAKa) | −15 |
| PAK4 | −15 |
| PCTK2 (PCTAIRE2) | −18 |
| PKCa (PRKCA) | −22 |
| PKCd (PRKCD) | −16 |
| PKCq (PRKCQ) | −25 |
| PKR1 (PRKR; EIF2AK2) | −14 |
| PLCg1 | −24 |
| PLCg1 | −12 |
| PTEN | −24 |
| PTEN | −37 |
| RelB | −21 |
| RSK3 (RPS6KA2) | −21 |
| S6Ka (RPS6KB1) | −12 |
| VAV1 | −31 |
| Vimentin | −39 |
| Yes | −14 |

In a further trial, 15 nude mice, which were lacking an immune system, were injected with 1×10⁶ human breast cancer cells of type MDA-MB-231 to start the formation of a tumour that models human breast tumours. The tumour was allowed to grow for 21 days after the injection of cancer cells, at which time the average tumour size was approximately 0.5 cm.

The mice were divided into three groups of five mice. The group A was a control group and the mice were not subject to treatment. The mice of group B and group C were treated using a device according to the invention having a transmitter manufactured from a semi-rigid RF-405 cable. The signal frequency used was 2.2 GHz. The peak power of the electrical signal supplied to the transmitter was 30 W and the duty cycle was 5% for all treatments. So that the thermal impact was negligible, the pulsed electric field was kept on for 40 seconds and then switched off for 40 seconds.

For the group B, the pulse width was 40 µs and the mice were subject to 10 on-off cycles of the pulsed electric field. For the group C, the pulse width was 74 µs and the mice were subject to 4 on-off cycles of the pulsed electric field.

Figure 13:
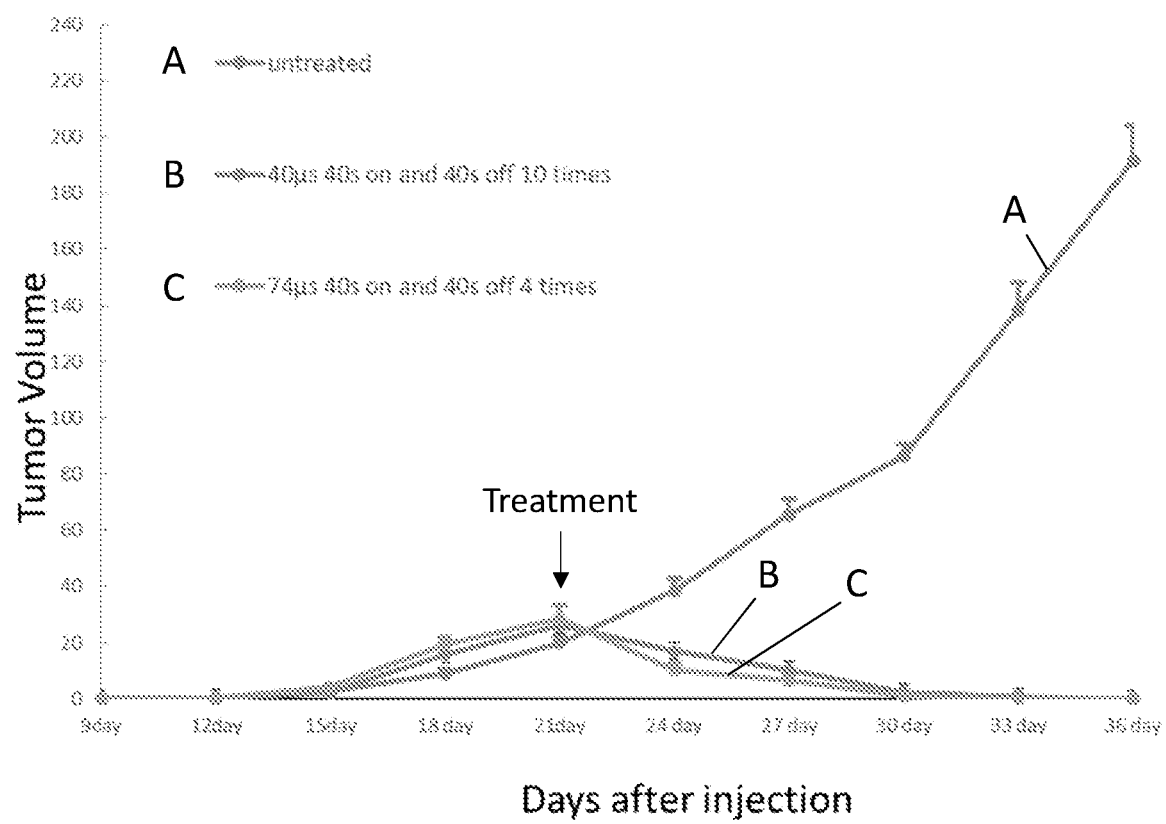
FIG. 13 shows how tumour size changes with time in a first trial using mice.

FIG. 13 shows how the volume of the tumours developed before and after the treatment. As it can be seen, all treated tumours (in the mice of groups B and C) disappeared completely 12 days after treatment. The tumours in the mice of the control group (group A) continued to grow through the entire 33 days.

In the above trial, the entire tumours were exposed to the electric field as the size of the tumours were relatively small. A second trial using mice was conducted in which the tumours were allowed to grow to about 1 cm in diameter. Again, 15 nude mice having the tumours were divided into three groups of five mice. Two of the groups were subject to the same treatment as in the first trial. Due to the greater size of the tumours in the second trial, only a portion of each tumour was exposed to the electric field during the treatment.

Figure 14:
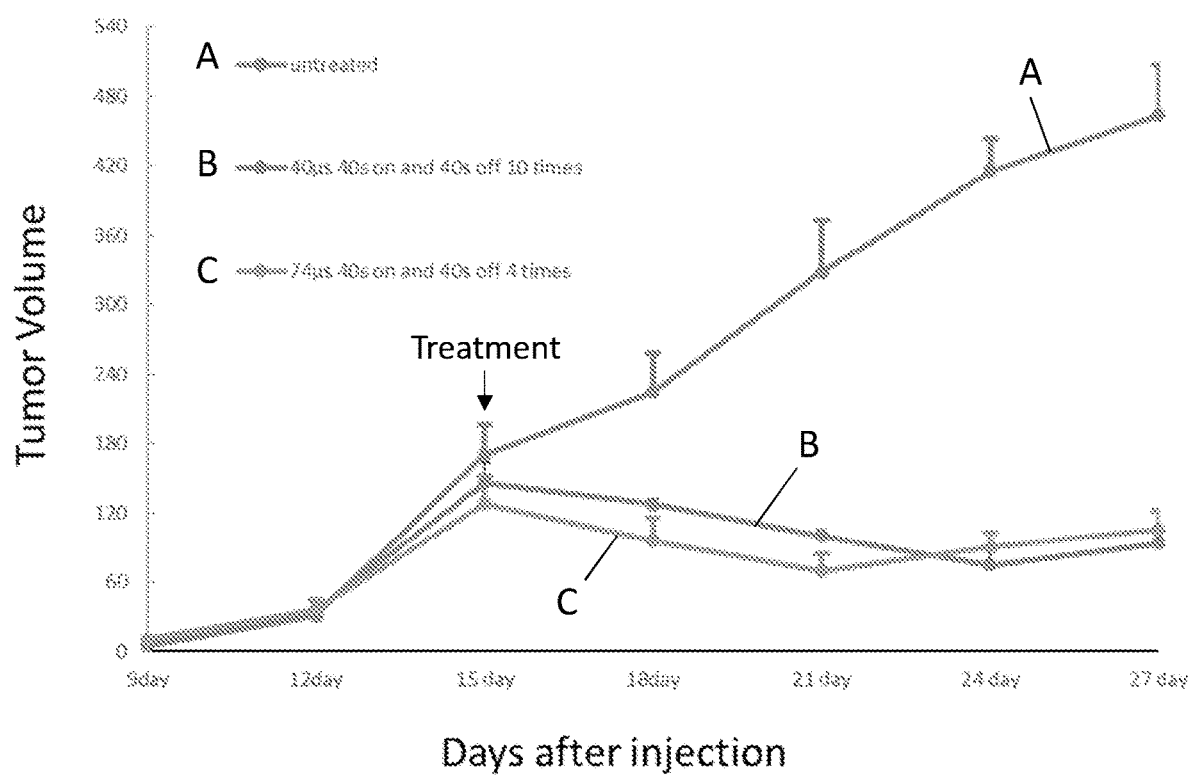
FIG. 14 shows how tumour size changes with time in a second trial using mice.

FIG. 14 shows how the volume of the tumours developed before and after the treatment. As can be seen, the treated tumours (in the mice of groups B and C) shrank approximately by a factor of two. This may indicate that the cell death mechanism was only initiated in the cancer cells that were directly exposed to the electric field, and the remaining cancer cells continued to multiply causing the tumour to grow again around 9 days after the treatment. The untreated tumours in the control group mice continued to grow for the entire duration of the study.

Figure 16:
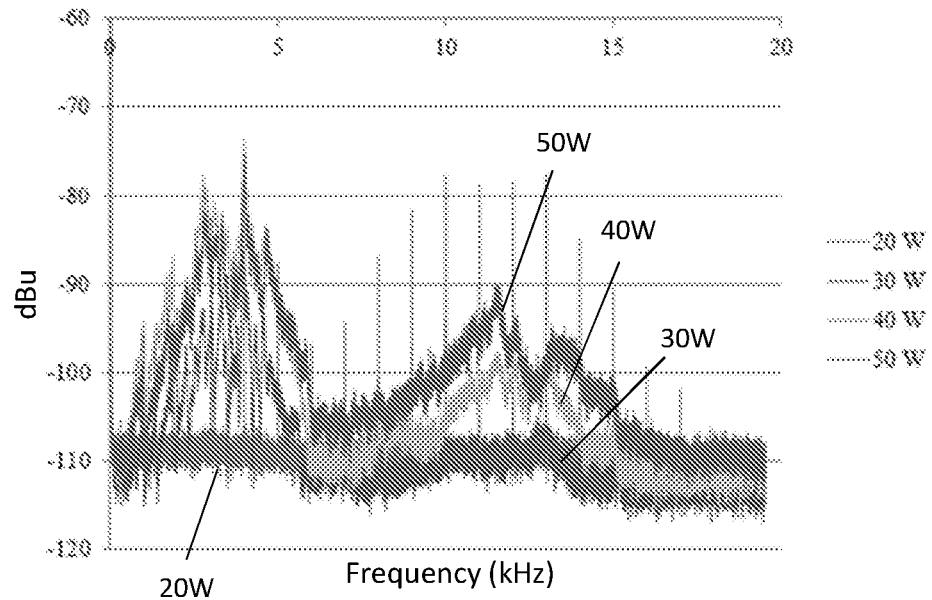
FIG. 16 shows measured sound levels within a sample liquid whilst the sample is treated with pulsed RF electrical signals delivered by a transmitter according to the invention.

An investigation has also been conducted into the influence and relevance of the evanescent field generated by the transmitter. In a first instance a transmitter in the form of a coaxial cable was immersed in a sample liquid. A hydrophone was also immersed in the liquid and used for measuring the sound level. The sound level was measured over a range of sound frequencies whilst the transmitter was used to generate an electric field in response to a pulsed RF electrical signal. The sound was measured with the signal having 20 W, 30 W, 40 W and 50 W peak power levels. FIG. 16 shows the sound level vs sound frequency for each signal. As can be seen, sound is generated over a range of sound frequencies. In general, the sound levels increase as the peak power increases.

Figure 17:
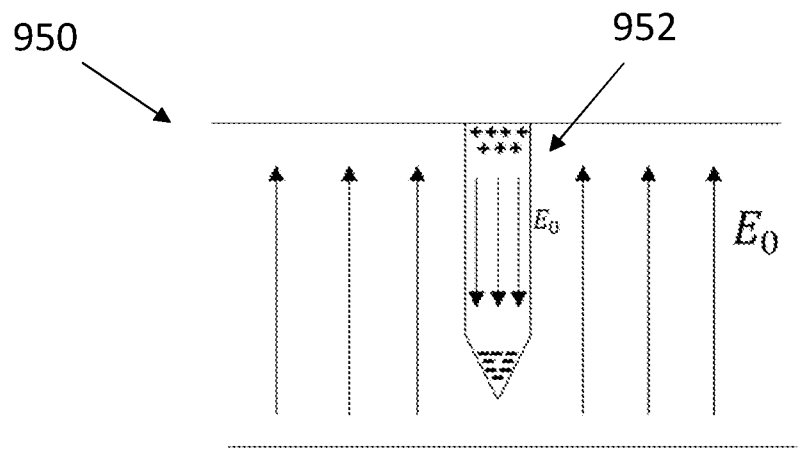
FIG. 17 shows a schematic representation of a sample within a microwave resonator.
Figure 18:
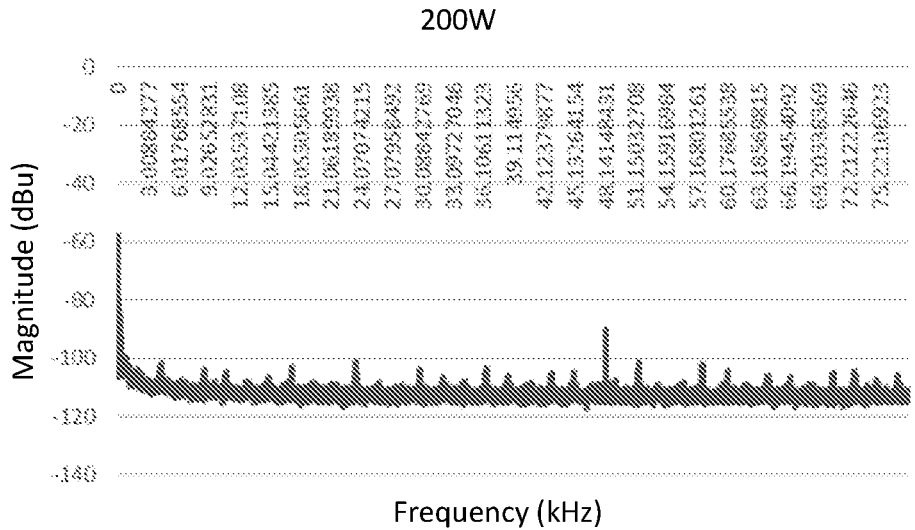
FIG. 18 shows measured sound levels within a sample liquid whilst the sample is treated with pulsed RF electrical signals delivered by a microwave resonator, the electrical signal having a peak power of 200 W.

The same microwave signal was injected into a sample volume by a method that does not produce any evanescent field. In this case, a microwave resonator 950 was utilised into which a sample 952 was placed, as shown schematically in FIG. 17. Such resonators produce uniform interrelated electric and magnetic fields without the strong localisation that is created by the evanescent fields. The sound levels were measured whilst exposing the sample volume to the same pulsed microwave signal within the resonator. No sound was detected in the sample, even up to power levels of 200 W, at which point the treated volume started to boil. FIG. 18 shows the sound level vs sound frequency for a signal having a peak power level of 200 W.

Figure 19:
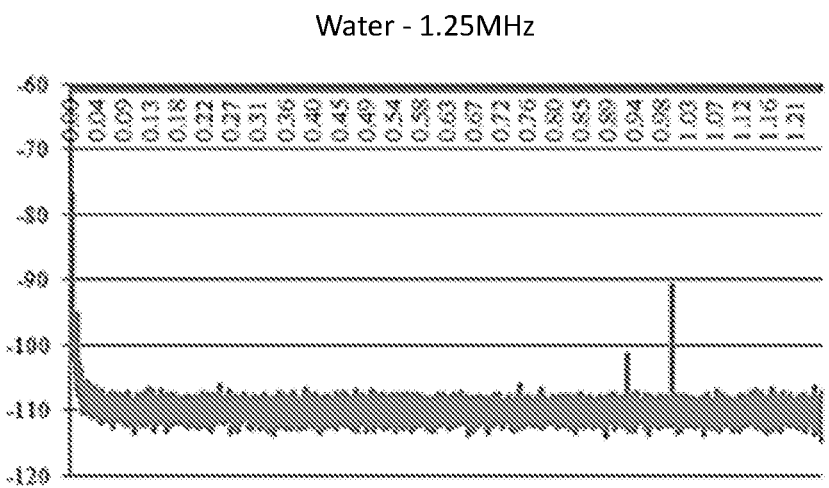
FIG. 19 shows measured sound levels within a water based sample with little or no ionic content whilst the sample is treated with pulsed RF electrical signals.

Finally, a transmitter (not being in the form of a resonator) was used to generate the same microwave signal in a water based sample with little or no ionic content. FIG. 19 shows the sound level vs sound frequency measured in the water-based sample. As can be seen, no sound was detected in the sample. The small frequency peaks around 1 MHz are measurement artefacts that were also present when no pulsed microwave signal was injected.

As a result of this investigation, it is thought that the evanescent field may be the cause of the mechanical movement leading to the formation of the sound waves. It is also thought that the cause of the mechanical movement leading to the formation of the sound waves may be linked to the ionic content and/or any charged particles of the sample, and could result from movement/vibration of the ionic content under the action of the magnetic and/or electric field. It is thought the mechanical pressure waves, detectable as sound, may play a role in causing cell death. It is also thought possible that cell death could be attributed to some combination of the effects of the evanescent field and the electric field in the region beyond the evanescent field (i.e. in the far field region).

The mechanism of generating the sounds within the samples is thought to be different from a more common sonication where piezoelectric transducers or capacitive transducers are utilised to generate direct mechanical movement. Such devices are considered to generate sounds within a sample volume due to cavitation, whereby the vibration at an interface between the sample and the transducer forms small vapour-filled cavities with low pressure that collapse to form a shock wave. With the present invention, the sound generation may be based on volumetric heating, due to the microwave signal, of the thin layer exposed to evanescent field. There being no hard moving interface between the sample and the probe tip, but rather elastic expansions and contraction of the exposed sample.

Whilst the present invention has been described and illustrated with reference to particular embodiments, it will be appreciated by those of ordinary skill in the art that the invention lends itself to many different variations not specifically illustrated herein. By way of example only, certain possible variations will now be described.

In embodiments, the device is battery powered and is portable. In embodiments, the device is wearable. The device may comprise fasteners for attaching the device to a user.

In an alternative embodiment, the device is arranged to receive a volume of liquid, in particular blood, and pass the liquid through the pulsed electric field. In embodiments, a temperature sensor may monitor the temperature of the liquid and regulate generation of the electric field in dependence on the temperature. The device may be arranged to treat a volume of liquid in batches, i.e. a defined volume at a time, or the device may be arranged to treat a continuous flow of liquid.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. A medical device for inducing cell death in cancer cells, the medical device comprising:
   a signal generator arranged to generate a pulsed electrical signal, and
   a probe comprising a transmitter, the transmitter being arranged to receive the pulsed electrical signal and generate, in response to the pulsed electrical signal, an electromagnetic field in a treatment volume;
   wherein the electromagnetic field is generated at, and radiates from, a free end of the transmitter in use; and
   wherein the medical device is arranged such that the pulsed electrical signal received by the transmitter has:
   a pulse width in a range of 0.1 microsecond to 1 millisecond, and
   a signal frequency in a range of 100 Megahertz to 20 Gigahertz; and
   wherein the transmitter is a broadband transmitter configured to generate the electromagnetic field in response to the pulsed electrical signal over a range of signal frequencies from 100 MHz to 20 GHz.

2. A medical device according to claim 1, comprising one or more further transmitters, the device being arranged such that a time varying electric field generated by each transmitter is synchronized.

3. A medical device according to claim 1, wherein the probe comprises a temperature sensor arranged to obtain an indication of the temperature of the treatment volume.

4. A medical device according to claim 3, wherein the temperature sensor is a fibre optic temperature sensor.

5. A medical device according to claim 1, wherein the medical device is configured to determine a temperature of the material in the treatment volume by measuring an electrical signal that is reflected back from the transmitter.

6. A medical device according to claim 1, wherein the device is arranged to cease transmission of the electromagnetic field into the treatment volume if it is determined that a temperature of the treatment volume exceeds a threshold level.

7. A medical device according to claim 6, wherein the threshold level is set such that the temperature of the treatment volume is not heated above an initial temperature by more than 5° C. or does not exceed 41° C.

8. A medical device according to claim 1, further comprising a directional coupler arranged to provide an output from which the power deposited into the treatment volume can be monitored.

9. A medical device according to claim 1, wherein the medical device is arranged to obtain an indication of the impedance of the treatment volume.

10. A medical device according to claim 1, wherein the pulse width is in the range of 1 microsecond to 500 microseconds, preferably 1 microsecond to 100 microseconds, and preferably 30 to 80 microseconds.

11. A medical device according to claim 1, wherein the medical device is arranged such that the pulsed electrical signal received by the transmitter has a peak power of in the range of 10 milliwatts to 300 Watts, preferably 100 milliwatts to 100 Watts, and preferably 1 Watt to 50 Watts.

12. A medical device according to claim 1, wherein the medical device is configured such that the pulsed electrical signal received by the transmitter has a pulse frequency in the range of 0.01 kilohertz to 1 megahertz, preferably 0.01 kilohertz to 100 kilohertz, and preferably 0.1 kilohertz to 10 kilohertz.

13. A medical device according to claim 1, comprising an endoscope for guiding an insertion of the transmitter into the volume of cells to be treated.

14. A medical device according to claim 1, wherein the medical device is configured such that the transmitter generates an evanescent field in the treatment volume.

15. A medical device according to claim 1, wherein the transmitter is formed of a coaxial cable.

16. A medical device according to claim 15, wherein the coaxial cable has a tapered end at which the electromagnetic field is generated.

17. A method of inducing cell death using a medical device, wherein the medical device comprises:
   a signal generator arranged to generate a pulsed electrical signal, and
   a probe comprising a transmitter, the transmitter being arranged to receive the pulsed electrical signal and generate, in response to the pulsed electrical signal, an electromagnetic field in a treatment volume;
   the method comprising the steps of:
   positioning the probe such that the treatment volume contains a volume of cells to be treated;
   using the signal generator so as to generate the pulsed electrical signal; and
   the transmitter generating the electromagnetic field in the treatment volume in response to the pulsed electrical signal so received;
   wherein the electromagnetic field is generated at, and radiates from, a free end of the transmitter;
   wherein the pulsed electrical signal received by the transmitter has:
   a pulse width in a range of 0.1 microsecond to 1 millisecond, and
   a signal frequency in a range of 100 Megahertz to 20 Gigahertz; and
   wherein the transmitter is a broadband I transmitter configured to generate the electromagnetic field in response to the pulsed electrical signal over a range of signal frequencies from 100 MHz to 20 GHz.

18. A method according to claim 17, wherein the method comprises a step of obtaining an indication of a temperature of the treatment volume, and regulating the pulsed electrical signal received by the transmitter in dependence on the temperature.

19. A method according to claim 17, the method comprising a step of monitoring a power of the pulsed electrical signal sent to the transmitter and monitoring a power of a reflected electrical signal that is reflected from the transmitter.

20. A method according to claim 17, comprising positioning the transmitter such that at least some of the cells to be treated are within a penetration depth of an evanescent field generated by the transmitter.

21. A method according to claim 17, wherein the method comprises providing a plurality of transmitters, each transmitter generating a pulsed time varying electric field, the pulsed time varying electric fields being synchronised.

22. A method according to claim 17, the method being a method of treating cancer by inducing cell death in cancer cells.

* * * * *